Aug. 12, 1969  R. E. PAGE ETAL  3,460,515
MILKING SYSTEM
Filed June 25, 1965  15 Sheets-Sheet 1

INVENTORS.
RALPH E. PAGE
HENRY VAN DER HEIDE
By Smyth, Roston & Pavitt
ATTORNEYS.

INVENTORS.
RALPH E. PAGE
HENRY VAN DER HEIDE
BY Smyth, Roston & Pavitt
ATTORNEYS.

Aug. 12, 1969  R. E. PAGE ET AL  3,460,515
MILKING SYSTEM

Filed June 25, 1965  15 Sheets-Sheet 5

INVENTORS.
RALPH E. PAGE
HENRY VAN DER HEIDE
BY Smyth, Roston & Pavitt
ATTORNEYS.

INVENTORS.
RALPH E. PAGE
HENRY VAN DER HEIDE
ATTORNEYS.

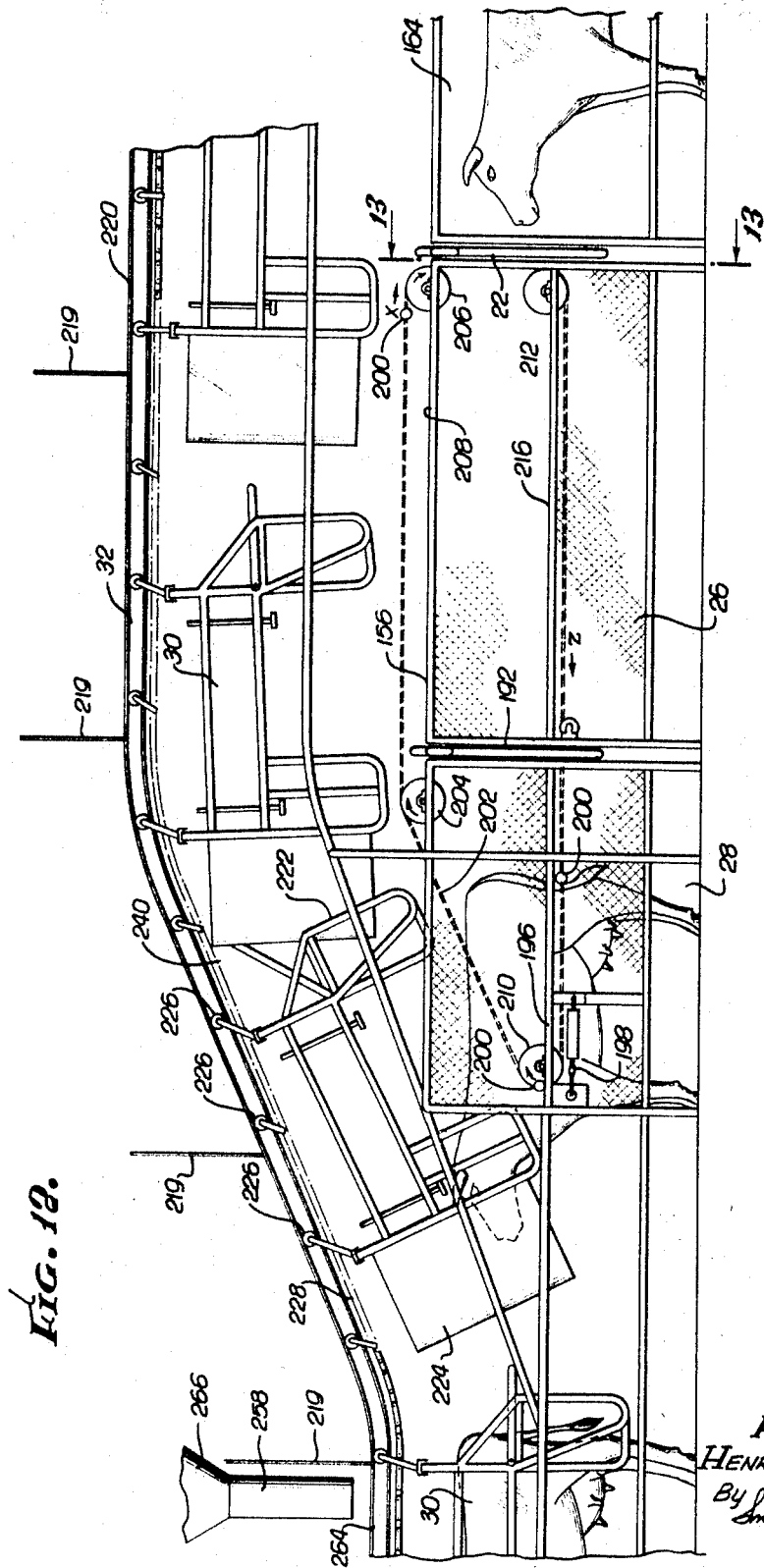

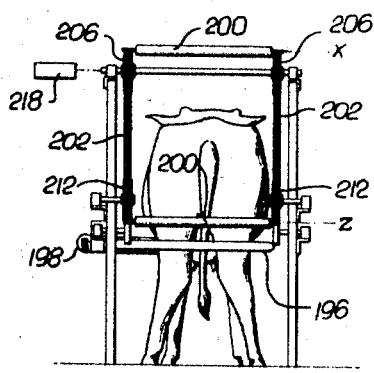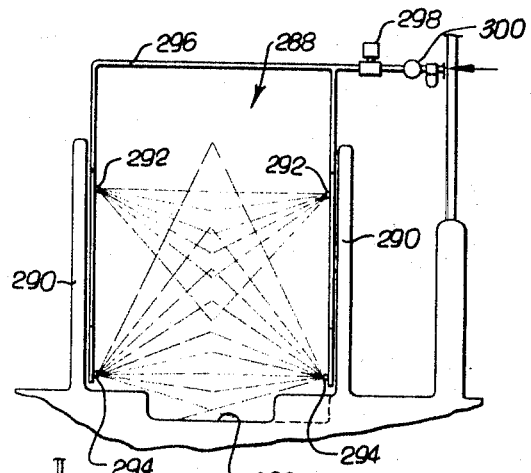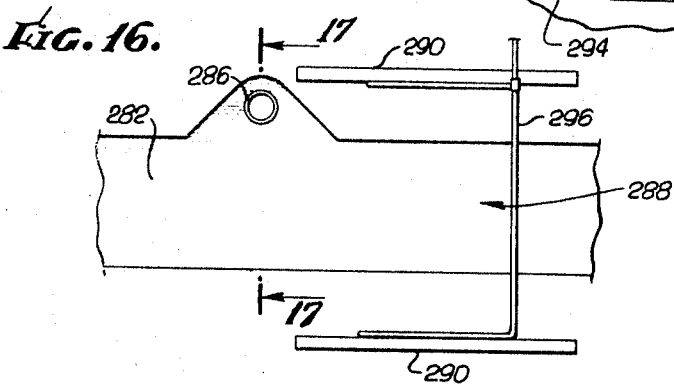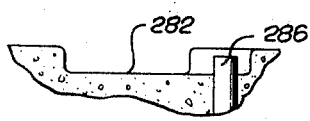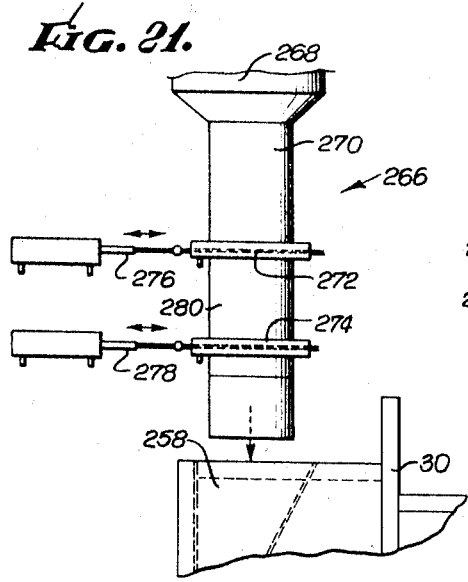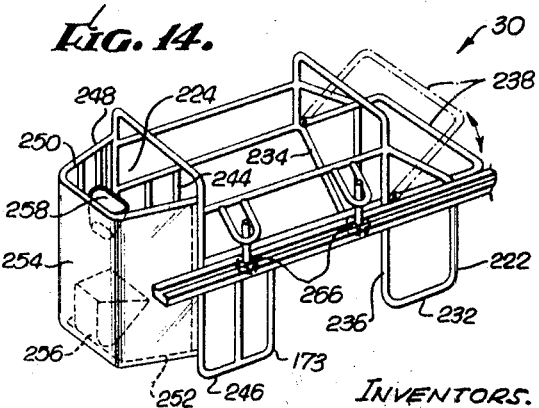

Aug. 12, 1969
R. E. PAGE ET AL
3,460,515
MILKING SYSTEM
Filed June 25, 1965
15 Sheets-Sheet 9
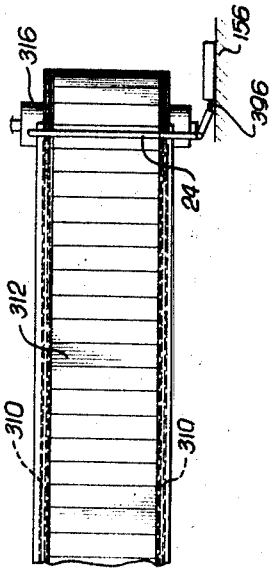
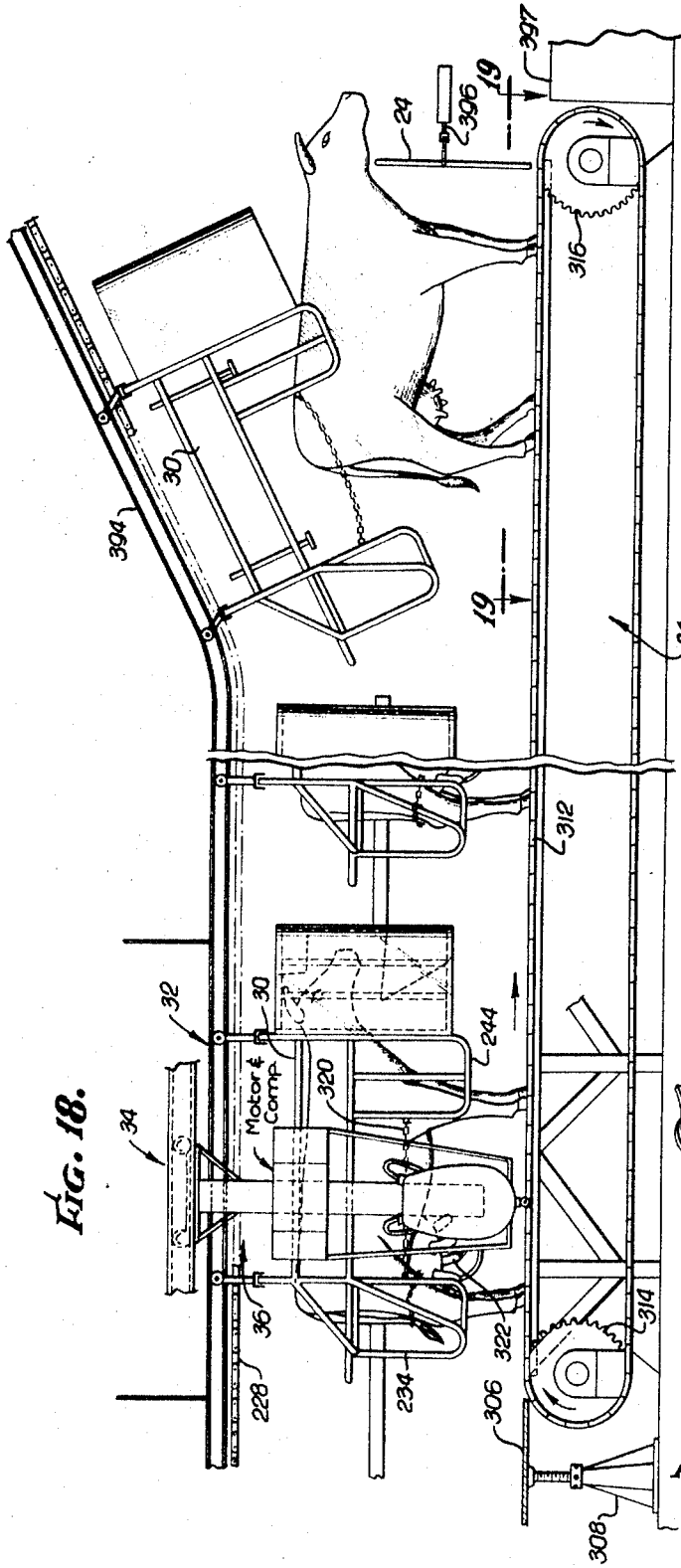
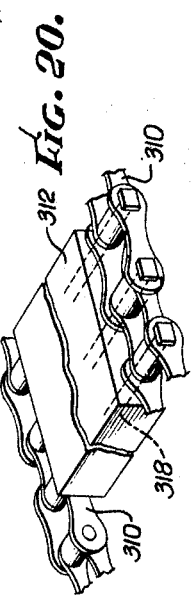
INVENTORS.
RALPH E. PAGE
HENRY VAN DER HEIDE
BY Smyth, Roston & Pavitt
ATTORNEYS.

Aug. 12, 1969  R. E. PAGE ET AL  3,460,515
MILKING SYSTEM
Filed June 25, 1965  15 Sheets-Sheet 10
Fig. 22.
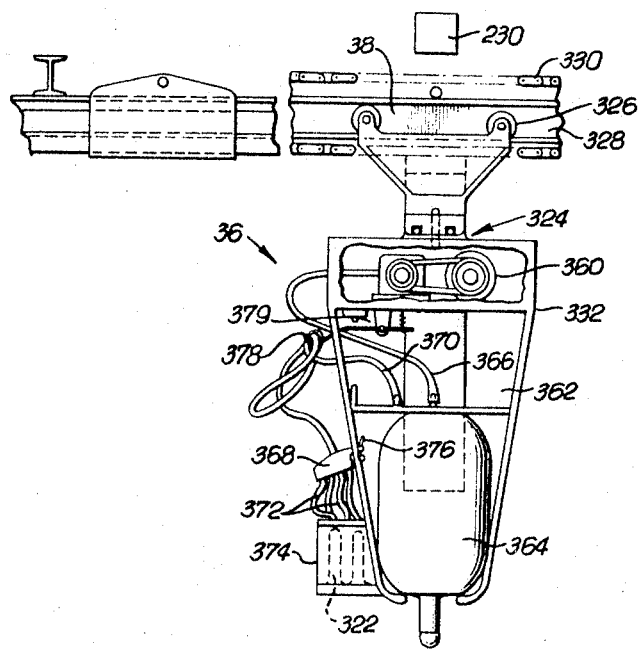
Fig. 23.
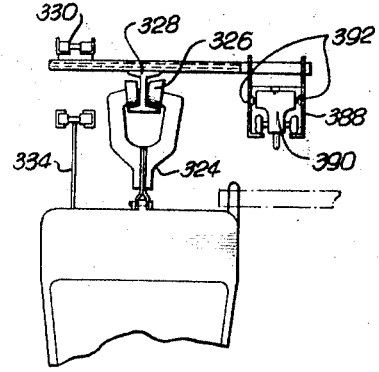
Fig. 36.
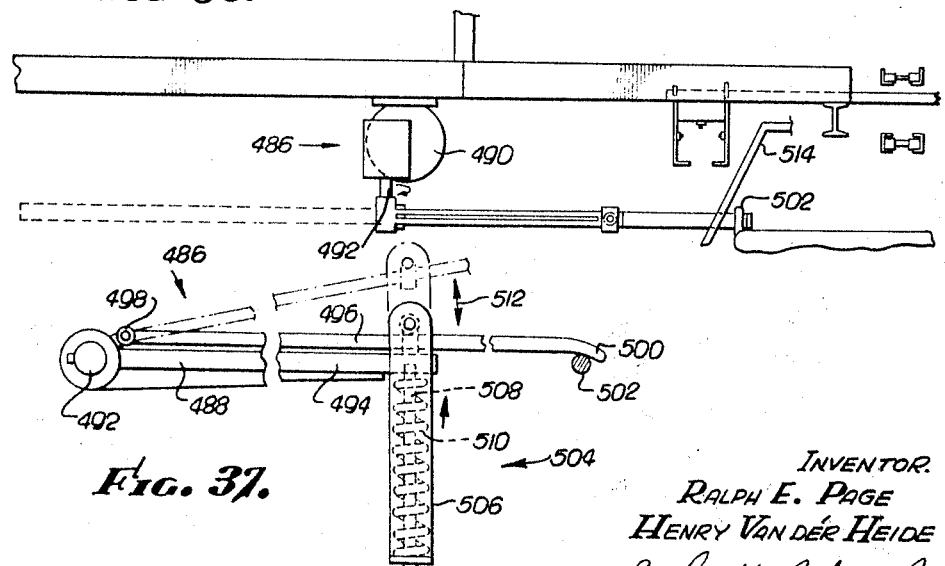
Fig. 37.
INVENTOR.
RALPH E. PAGE
HENRY VAN DER HEIDE
By Smyth, Roston & Pavitt
ATTORNEYS.

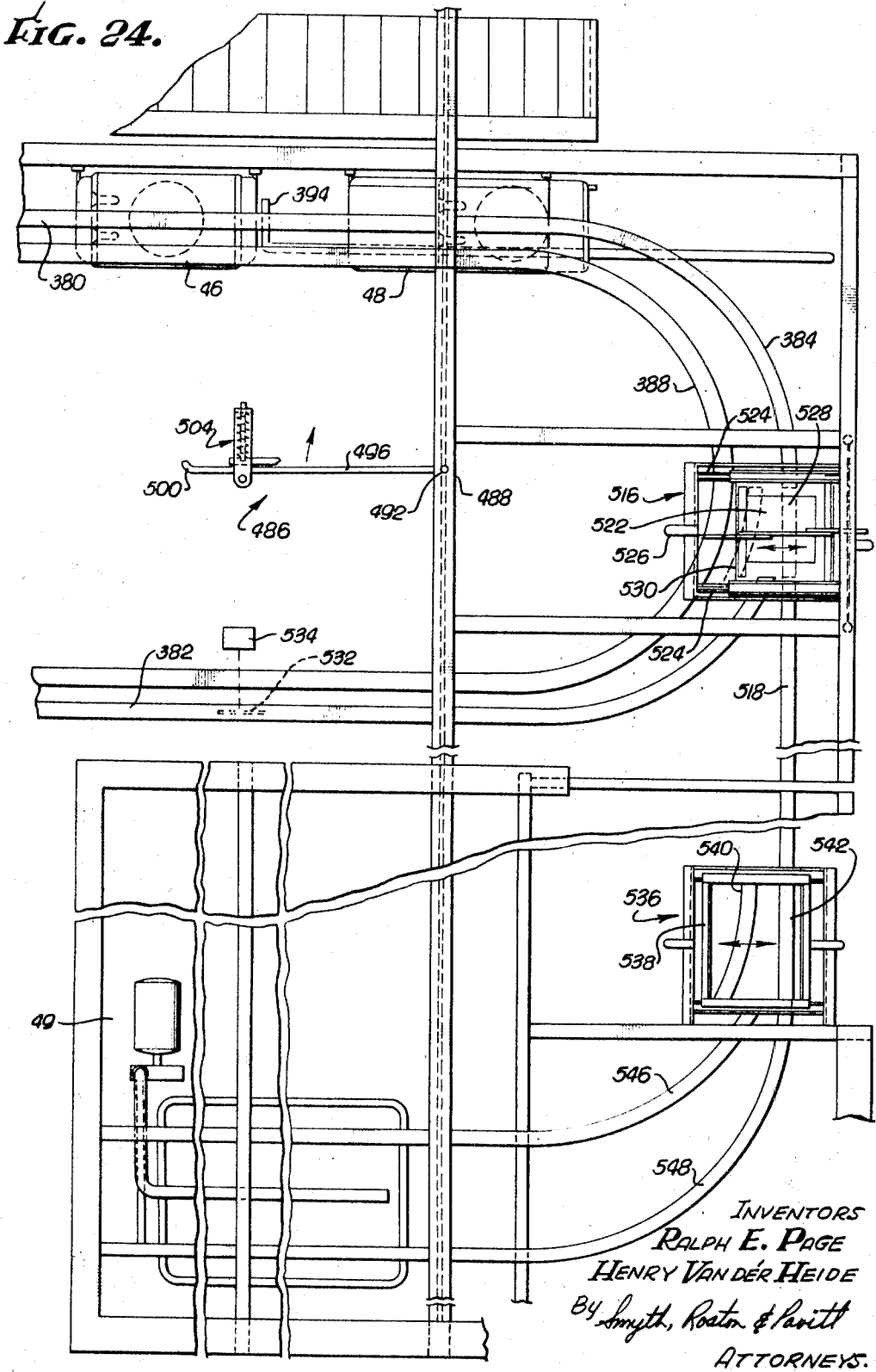

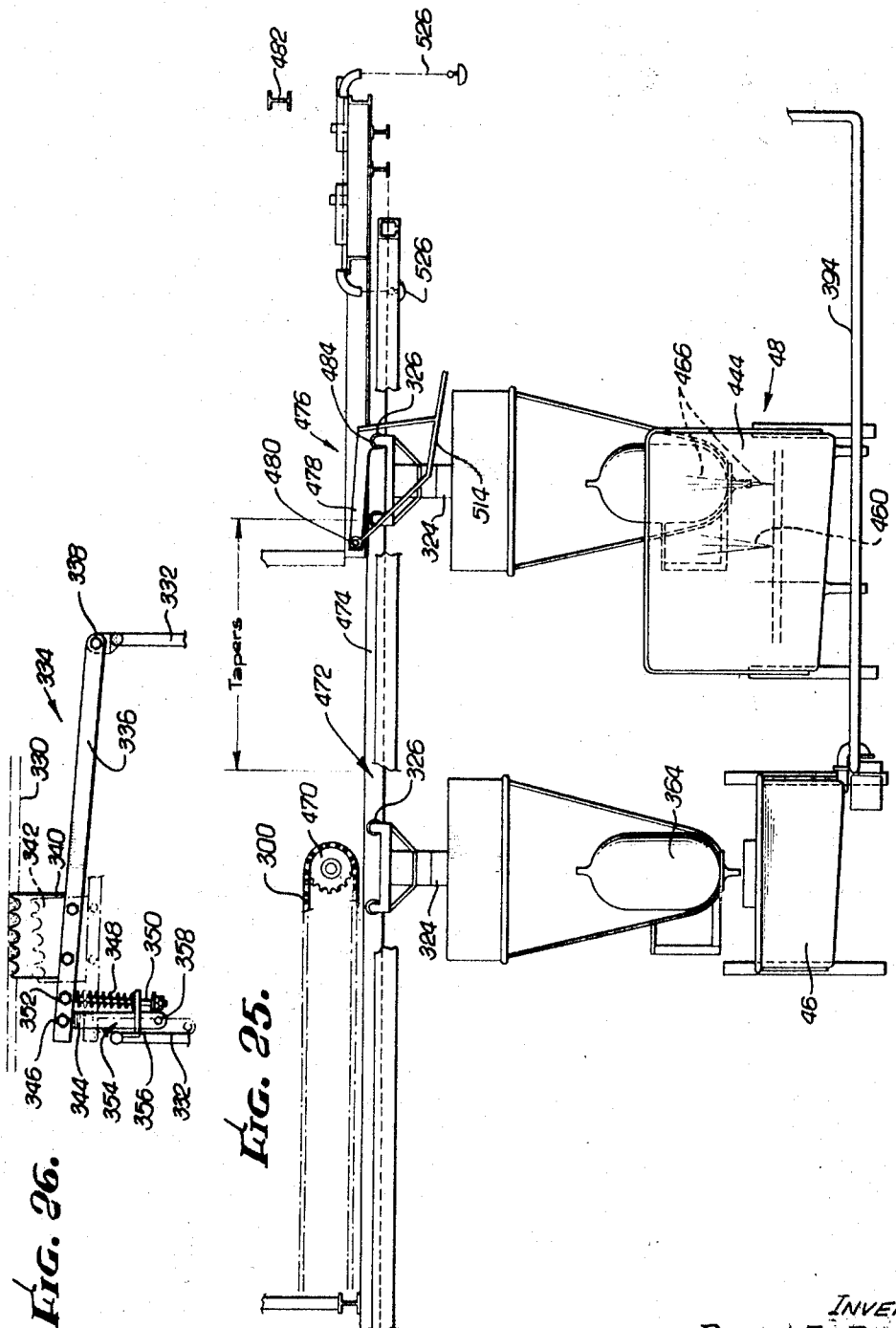

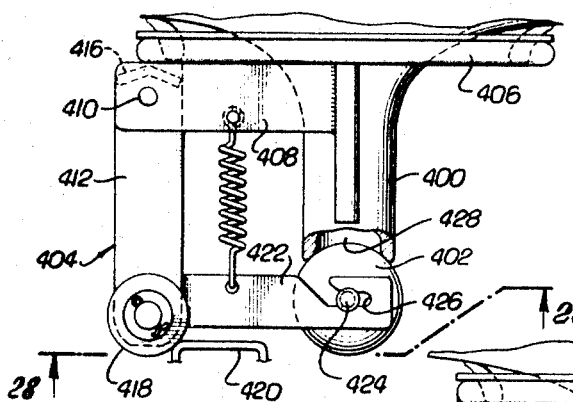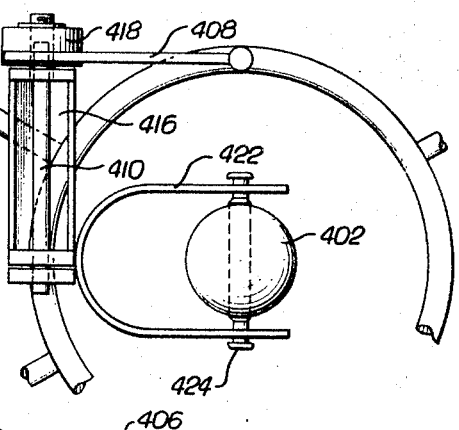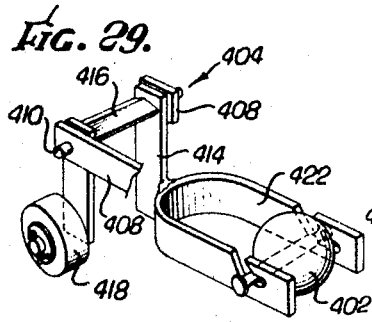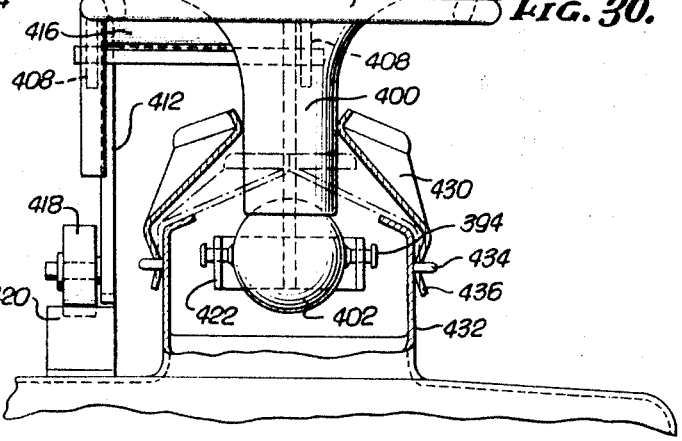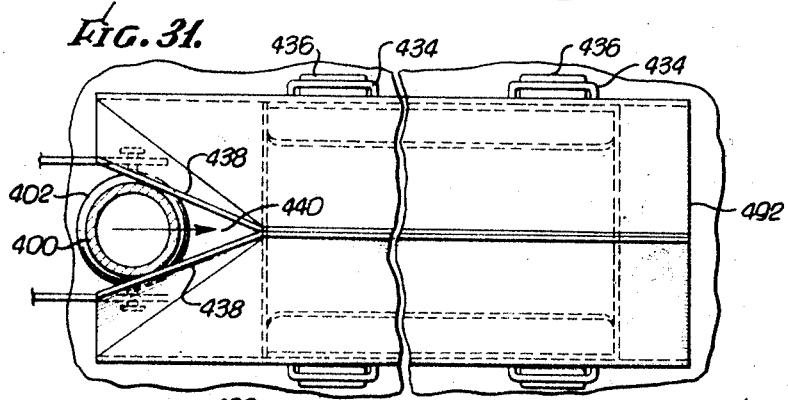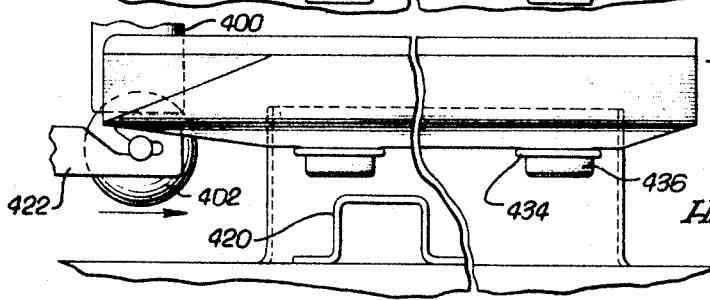

Aug. 12, 1969    R. E. PAGE ET AL    3,460,515
MILKING SYSTEM

Filed June 25, 1965    15 Sheets-Sheet 14

INVENTORS.
RALPH E. PAGE
HENRY VAN DER HEIDE
By Smyth, Roston & Pavitt
ATTORNEYS.

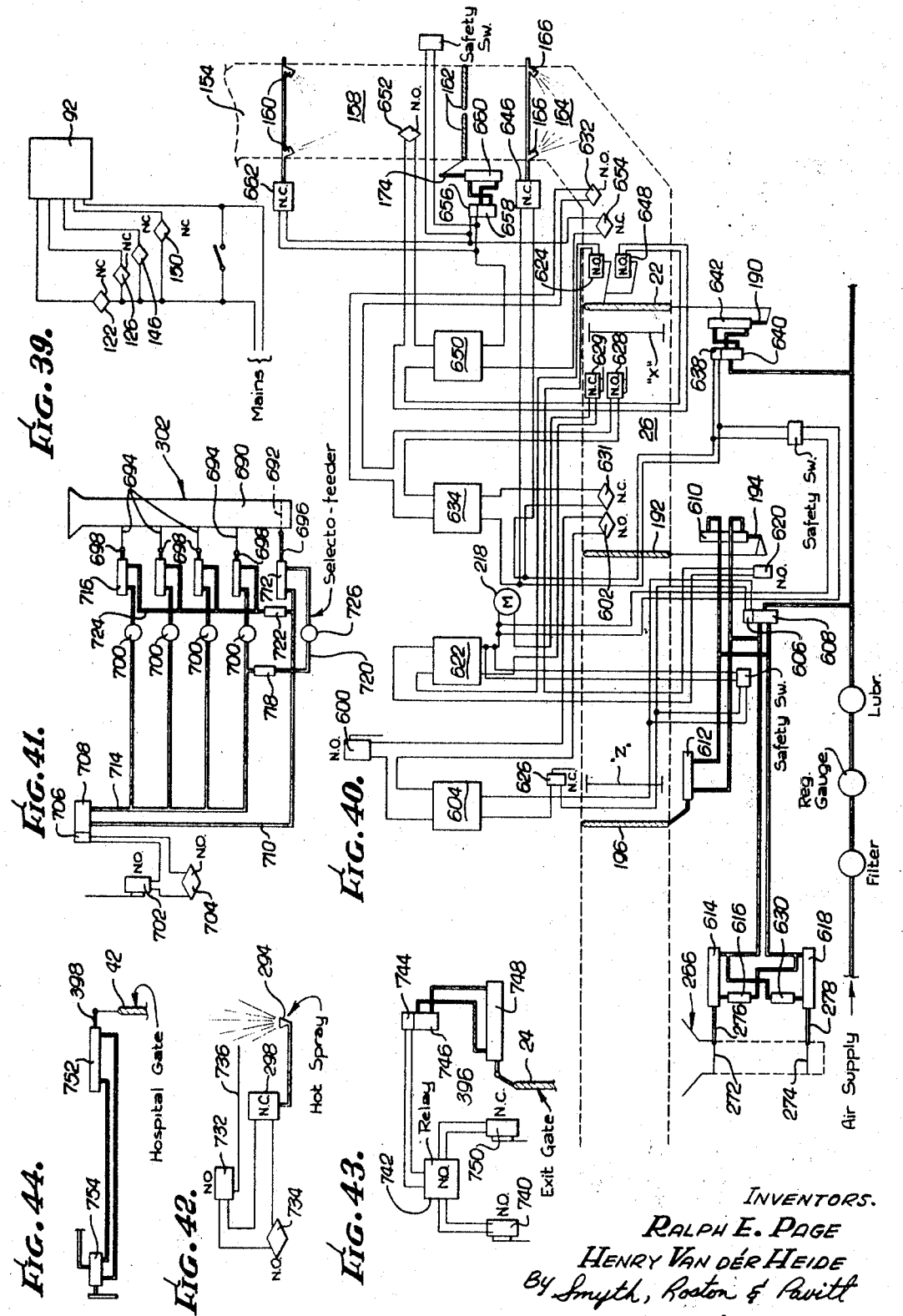

United States Patent Office 3,460,515
Patented Aug. 12, 1969

3,460,515
MILKING SYSTEM
Ralph E. Page, Van Nuys, and Henry van der Heide, Gardena, Calif., assignors, by mesne assignments, to Hahn Enterprises, Inc., Inglewood, Calif., a corporation of California
Filed June 25, 1965, Ser. No. 466,986
Int. Cl. A01j 5/00, 7/00; A01k 1/00
U.S. Cl. 119—14.04                                29 Claims

ABSTRACT OF THE DISCLOSURE

A radial gate sweeps a circular corral like the hand of a clock to herd successive groups of cattle into a lane leading into a first zone for washing and feeding the cows. Successive cages on an overhead conveyor drop down to captivate the cows and force them to walk through water and a series of sprays while the cows feed from troughs in the cages. The moving cages then enter a milking zone where the cows stand on a conveyor platform synchronized with the cages with individual traveling milking units coupled to the cows.

---

This invention relates to a system for handling milk cows in which each cow in the system is held in complete control so that it can be fed according to its individual needs and milk giving ability and be prepared for milking by washing, and milked while still in complete control.

For many years the dairy industry has striven to solve the many problems involved in individually handling milk cows in greater numbers without a corresponding increase in cost so as to make dairying more economically desirable. One of the problems that has plagued the industry is that of feeding each and every individual cow an exact amount of food according to its individual milking ability for maximum output of milk at minimum feed cost. One common practice heretofore has been to supply food on a herd basis, that is, to feed an entire herd a predetermined amount of food according to the number of cows and the average milk output of the herd, but as can be expected, there was no assurance that any one cow in the herd received more or less food than it needed. Another practice is to feed the cows individually while confined in rows of milking stalls, but this practice is not economical because of the number of employees required. Too, while it was recognized that the time to feed milk cows was during milking time when the herd was confined in stalls, the prior practices did not allow those cows requiring more food than others sufficient time to eat any additional food. As a result, some cows did not receive adequate feed while others may have received more than needed. The reason for this is that the actual time the herd was confined necessarily had to be as short as possible so that a large number of cows could be handled.

Another problem that has remained unsolved in prior practices is that of preparing the cows for milking by washing and drying them so as to prevent contamination of the milk and to do this within a short time. The time involved, of course, is dependent upon the weather and conditions of the field, less time being necessary in dry weather, but, even so, this meant another time delay during the milking period which contributed to the undesirability of prior milking practices because it was relatively impossible to handle more than a few cows at any one milking time.

It can also be appreciated that in any of the prior practices, preparing the cows for milking by washing and drying, the feeding thereof, etc., required a large number of employees which also contributed to the cost of the operation.

From the foregoing, it can be appreciated that time is an important factor in handling milk cows and, inasmuch as the prior practices were slow, many compromises had to be made from an ideal practice of individually washing, milking and feeding the cows, otherwise the entire dairy system would be uneconomical. One such compromise being, for example, the aforementioned feeding of all the cows on a herd basis so as to shorten the time for feeding and to reduce the number of employees involved.

One prior system has solved some of the aforementioned problems by confining the cows individually during milking time in individual moving cages which move along a platform conveyor with the milking units moving simultaneously therewith. This system speeded up the time required for milking and permitted the cows to feed while so confined. Too, inasmuch as the milking units could be attached by one operator as soon as the cows moved onto the moving platform conveyor, and could be removed by another operator at the other end of the platform conveyor, only two operators of the milking units were needed, thus the number of operators was reduced.

Although this prior system did give the cows an opportunity to eat while moving on the platform conveyor, the time still was not sufficient for proper feeding and as a result there were definite limitations on the amount of feed that could be given. This system, therefore, did not completely solve the food problem, nor did it solve the problem of washing and preparing the cows for milking because they were not segregated for a sufficiently long enough period of time before entering the platform conveyor to be completely washed and to dry. Too, still another deficiency in this prior system was the fact that since the cows were not segregated for any length of time before the milking units were attached, the cow was often not physiologically prepared to let down her milk and as a result often did not let her milk down until well along in her travel down the moving platform. This meant, of course, that often some of the cows were not fully milked which resulted in a loss of milk to the dairy operator.

Thus, a system which solves the aforesaid problems should segregate out individual cows as soon as possible after entering the system and confine and control each cow so that it can be individually fed according to its needs, given enough time to eat, given enough time so that it can be washed and be prepared for milking, and milked while still confined before being allowed to return to its herd.

The present invention teaches how the above solutions are accomplished and in accordance with these teachings the system is first divided into an entrance area into which the cows are herded and a control area to which the cows are directed from the entrance area. The entrance area comprises a corral having an exit by which the cows are segregated as they walk through the exit and from that time on until they leave the control area are controlled and confined completely segregated from one another. The control area includes both stationary and moving confining means which control and confine the cow while it is being washed, fed and milked. The moving confining means comprises a plurality of cages, each of which confines a cow therein yet, at the same time, requires the cow to walk a predetermined distance during which time each individual cow is fed once a controlled amount of food and is washed and prepared physiologically for milking. Thereafter, the cow, without being removed from its cage, may be fed again if it is determined to be necessary according to the cow's milk giving ability as the cow moves onto a floor type moving conveyor. At this time, self-contained power milking units traveling adjacent to and at the same rate of speed as the cages are connected to the traveling cow. After a required milking time, the milking units are removed, and the cage is then positioned so as to permit the cow to leave the cage and moving conveyor. Thereafter, the cage is then positioned where it is ready to receive another cow to repeat the washing, feeding and walk cycle again.

Each cow, upon leaving the cage, will leave the control area and may then be directed to its home corral or to a hospital area if treatment is found to be necessary.

Thus, this system solves the problem of feeding the proper amount of food by first being fed once while being washed as the cow walks within the cage which takes a sufficient time for the cow to eat; and, second, it is fed as it is being milked on the traveling conveyor if it is determined that that individual cow needs more food according to its individual milking ability.

Ths system also solves the problem of preparing the cow physiologically for milking because cows, being readily accustomed to routine, know that within a few moments after the washing operation is finished, the milking units will be put on and the cows will then be prepared for milking. Too, this system provides a means for applying heat to the udder at the end of the washing operation to additionally physiologically prepare the cows for milking.

It should also be pointed out that another problem which heretofore has remained unsolved and the solution to which is taught by the present invention is a means of preventing the spread of disease from one cow to another which occasionally occurs through the use of milking units which are used to milk several cows during any one milking time. This system solves this problem by providing a means for cleaning the inflations of the milking units and that portion of the vacuum tank where the milk is withdrawn so that each of the inflations and a portion of the vacuum tank are washed and disinfected after each vacuum tank has been emptied. This system thus provides for cleaning the inflations and parts of the milking unit after each cow is milked and does so conveniently and quickly without a loss of time so that a large number of cows can be handled during any one milking operation.

Still another deficiency in the prior milking system that utilized moving cages and a moving platform was that after the milking was completed, the cages were returned empty to the beginning of the moving platform. This meant that there was a waste of the use of the cages for approximately one-half the cycle. To solve this problem of loss in efficiency, the present system utilizes the cages almost all the time. The cages are used not only during the milking time like the prior art systems, but on the return cycle after the milked cow is allowed to leave the cage, the cage is almost immediately made ready to receive another cow, and what would be the equivalent of the return cycle in the prior systems is the washing and feeding cycle of this invention.

Thus, still another improvement of this system over prior art systems is that this system utilizes the return cycle of the moving confining means so as to accomplish the feeding and washing operations within as short a time as possible with the consequent elimination of inoperative time found in prior cage and overhead conveyor systems.

Another advantage of the present system is that while the cages are used, the cow is confined and is unable to see the washing devices, feeding devices or the milking devices and other devices in the system so as not to disturb the cow while it is eating. In addition to this, the confining means in this system makes the cow walk during the washing and first feeding operation which gives an opportunity to clean the hooves and lower parts of the cows more thoroughly than ever before.

Another problem in prior systems was that they were not arranged so that automatic operation was feasible. This invention solves this problem by providing not only a corral which can automatically herd the cows individually out its exit gate, but once out the exit gate the entire system of confining and controlling the movement of the cows is almost completely automatic.

Other and additional features and advantages of the present invention will become apparent from a more detailed description of the drawings, wherein:

FIGURE 12 is an elevational view illustrating the control stalls and the positioning of the cages on the conveyor in timing sequence to receive a cow in the washing and feeding zone;

FIGURE 13 is a cross-sectional elevational view taken along line 13—13 of FIGURE 12 and illustrating to advantage the position of the moving barrier for urging the cows forward toward the cages;

FIGURE 14 is a perspective view illustrating to advantage the details of construction of one of the cages;

FIGURE 15 is a cross-sectional elevational view of one of the spray racks in the washing and feeding zone as exemplified in FIGURE 2 and taken along line 15—15 of FIGURE 2 and looking in the direction of the arrows;

FIGURE 16 is a plan view illustrating the wash rack as it is located with respect to the channel for washing the hooves of the cows;

FIGURE 17 is a cross-sectional view taken along line 17—17 of FIGURE 16 illustrating the drain system for the channel;

FIGURE 18 is a side elevational view telescoped to show the beginning of the milking operation as the cows enter the moving conveyor and are connected to the milking units and to illustrate the end of the milking operation and the release of the cows from their confinement;

FIGURE 19 is a top plan view of a part of the moving platform to clearly illustrate the manner of driving the same and taken along line 19—19 of FIGURE 18 and looking in the direction of the arrows;

FIGURE 20 is an enlarged perspective detailed showing of forming the platform conveyor with the sprocket chains;

FIGURE 21 is a schematic illustration of the feed supply arrangement for dropping feed into the cages illustrated schematically in this figure below the feed supply arrangement;

FIGURE 22 is a side elevational view partly broken away to illustrate the electrical and pneumatic components of the milking units with the dolly attached to its conveyor;

FIGURE 23 is an end elevational view illustrating to advantage the means of connecting the dolly to the conveyor and illustrating the electrical connection to the electrical track;

FIGURE 24 is a plan view of one end of the conveyor for the milking units and illustrating the switching means for directing the milking units to the washing and repair station; this view being telescoped so that a major portion of the components may be clearly shown;

FIGURE 25 is a side elevational schematic view of the milking units positioned over the milk receiver tank and washing station;

FIGURE 26 is an elevational view of the latching mechanism for connecting the milking units to the conveyor;

FIGURE 27 is a detail view of the bracket for opening and closing the milk receiving vacuum tank of the milking unit;

FIGURE 28 is a view of the bracket taken along line 28—28 of Figure 27 and looking in the direction of the arrows;

FIGURE 29 is a perspective view of this bracket illustrated in FIGURES 27 and 28;

FIGURE 30 is an end view of the bracket at a position where the neck of the vacuum tank opens the covers to the milk receiver tank and at a position where the bracket is ready to be moved to open the vacuum tank to allow the milk to flow into the receiver tank;

FIGURE 31 is a top view of the covers for the receiver tank and the neck of the vacuum tank in a position ready to open the covers;

FIGURE 32 is a side elevational view of the covers and neck shown in FIGURE 31;

FIGURE 36 is a schematic elevational view of the mechanism for moving the pickup mechanism for moving the milking units around the curved portion of the conveyor;

FIGURE 37 is a top view of a portion of the pickup mechanism;

FIGURE 39 is a schematic illustration of the wiring for the detecting means of the sweep gate;

FIGURE 40 is a schematic illustration of the electrical, pneumatic and hydraulic components for the automatic operation of the milking system;

FIGURE 41 is a schematic illustration of the electrical and pneumatic components for the automatic operation of the feed supply arrangement where the feed supply may be varied;

FIGURE 42 is a schematic illustration of the pneumatic and hydraulic components for the automatic operation of a hot spray in the washing and feeding zone;

FIGURE 43 is a schematic illustration of the electrical and pneumatic components for the automatic operation of the exit gate of the system; and FIGURE 44 is a schematic illustration of the pneumatic system of operation of the hospital gate.

General arrangement

Figure 1:
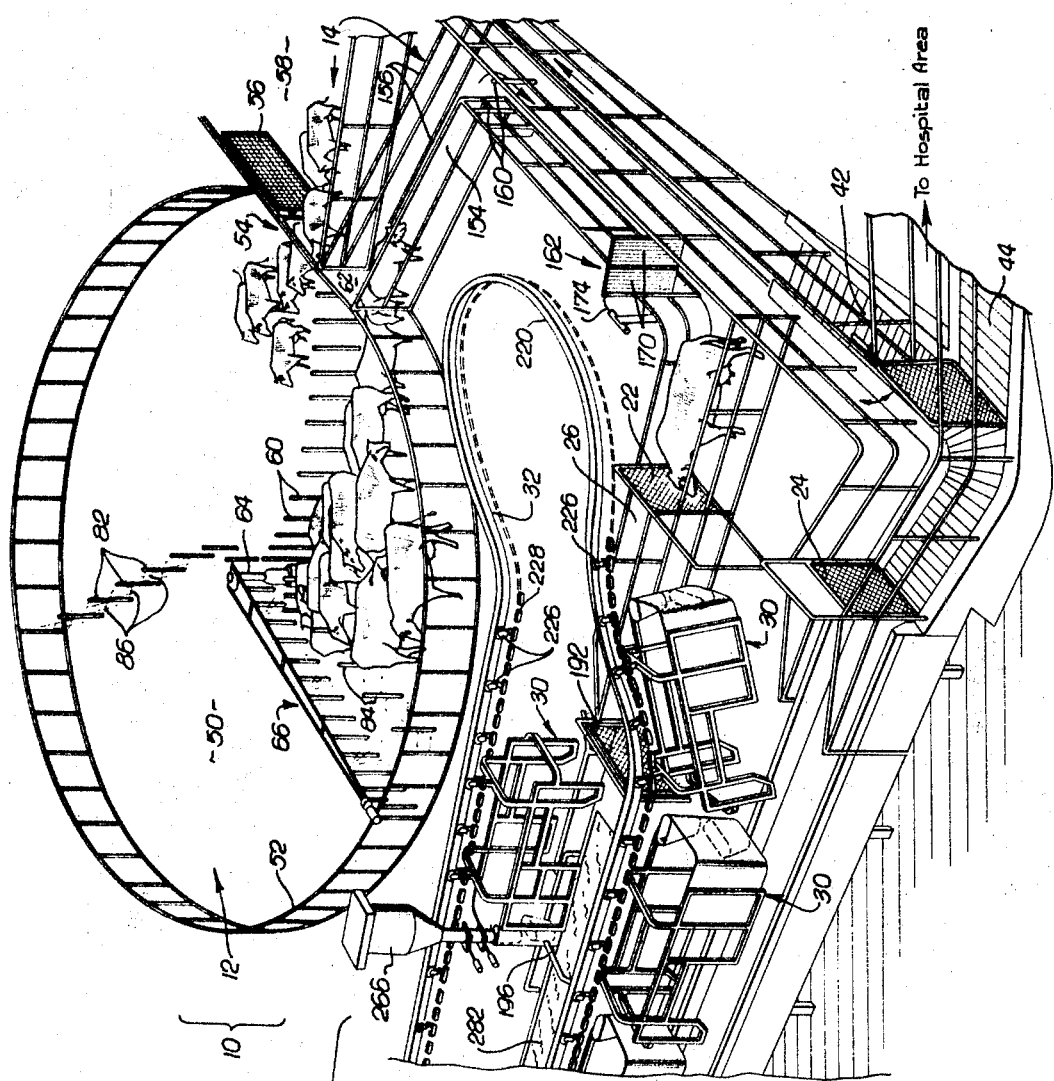
FIGURE 1 is a perspective view telescoped to show the system in its entirety with some of the components removed to illustrate the operation of the system more clearly.
Figure 2:
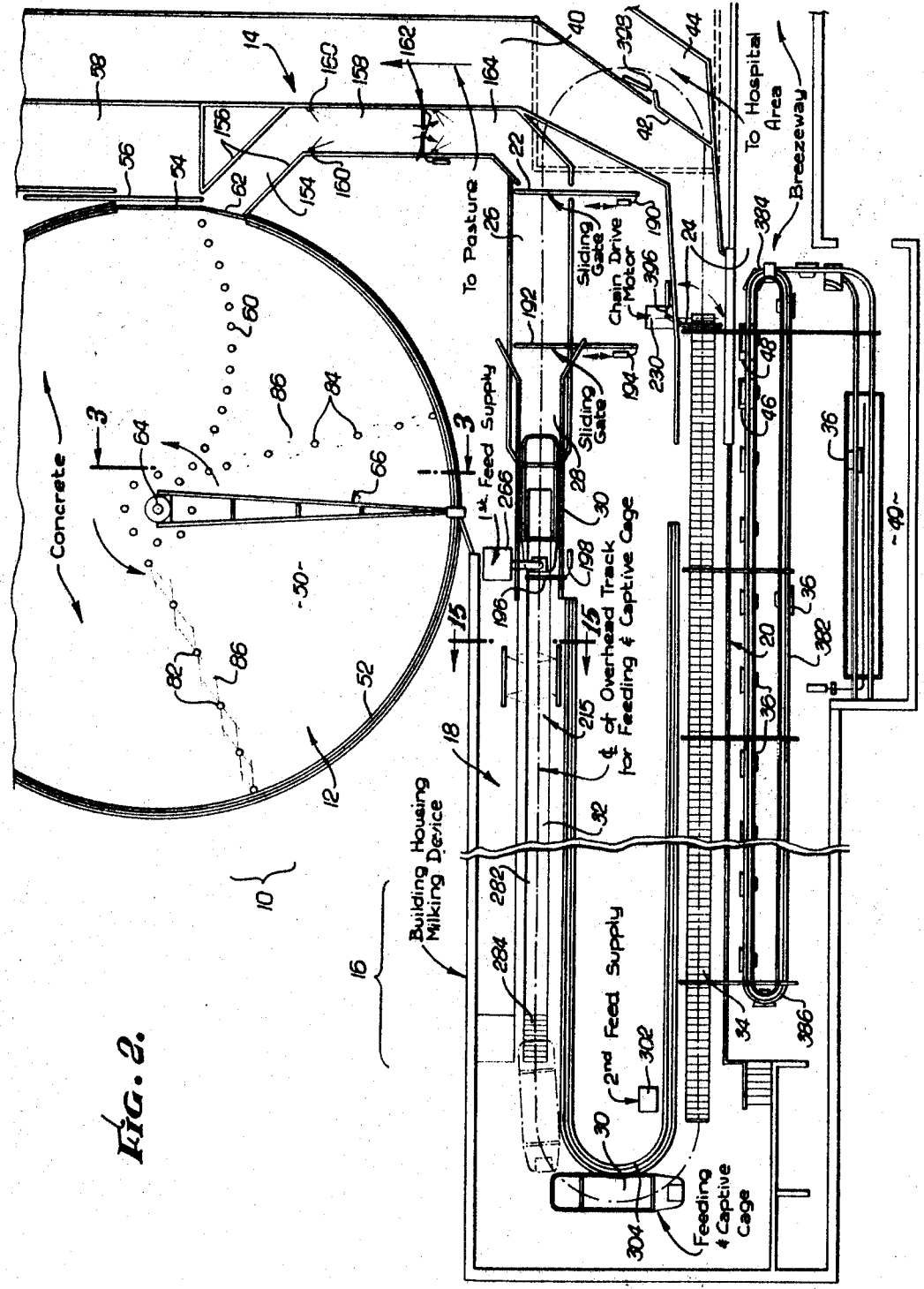
FIGURE 2 is a plan view of the system telescoped to show the system in its entirety.
Figure 3:
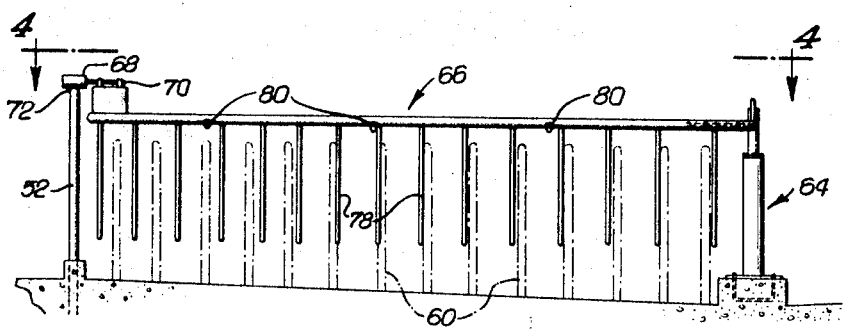
FIGURE 3 is an elevational view of the sweep gate and the means for separating the entrance and exit of the corral taken along line 3—3 of FIGURE 2 and looking in the direction of the arrows.
Figure 4:
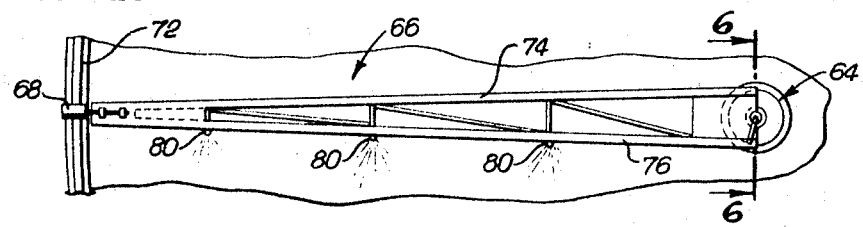
FIGURE 4 is a partial plan view illustrating the sweep gate taken along line 4—4 of FIGURE 3 and looking in the direction of the arrows.

Turning now to FIGURES 1 and 2, the milking system herein disclosed comprises an entrance area 10 having a circular corral 12 connected by an entrance lane 14 to a control area indicated in its entirety as 16 and which comprises a washing and feeding zone 18 and a milking zone 20. The control area 16 begins with gate 22 and ends with gate 24. The washing and feeding zone 18 also begins at gate 22 and includes a first control stall 26, a second control stall 28 and a plurality of cages 30 suspended on an overhead conveyor 32. Stalls 26 and 28 confine a cow to be milked therein for entry into the cage 30, and once the cow enters one of the cages 30, the latter causes the animal to walk through the remainder of the washing and feeding zone 18 and onto a floor type conveyor 34 where the milking zone 20 begins. A plurality of self-contained power milking units 36 are suspended from an overhead conveyor 38 and moved in timed sequence with the cages 30 and the floor conveyor 34. The milking units 36 are connected to the cows at the beginning of the milking zone 20 and are disconnected at the end of the milking operation, at which time the cage 30 is lifted (see FIGURE 1) to let the cow emerge. As the cow walks toward the exit gate 24, the latter is opened, marking the end of the control area. The cow can return then to its corral through return lane 40 or be diverted by gate 42 to hospital lane 44 and into a hospital area (not shown).

In the meantime, the milking units are emptied into a receiver tank 46 and the inflations and vacuum tank thereof washed at washing station 48 and then returned to the beginning of the milking zone 20 for use.

At the end of the entire milking operation or at any time any milking unit needs to be repaired, the milking units can be moved to a washing and repair room 49 where there are facilities for thoroughly washing each milking unit and for repairing any milking unit.

Entrance area

Turning now to FIGURES 1–7, inclusive, the corral 12 comprises a large area 50 preferably of concrete defined by a circular fence 52 having an entrance 54 with a barrier in the form of a slidable gate 56 operable to admit cows from a fenced land 58 into two main parts by a plurality of vertical posts 60 that separate the entrance 54 from an exit 62 so that the cows entering the entrance 54 must walk around the vertical center post 64. The corral 12 is also provided with a sweep gate indicated in its entirety as 66 which, as more clearly shown in FIGURES 1, 3 and 4, extends from the corral center to the peripheral fence 52 on a radius line. Sweep gate 66 traverses the corral in a sweep counter-clockwise through the posts 60 and serves to urge the cows entering the entrance 54 around the corral and out the exit 62. Posts 60 are disposed in a curved row with the center of the row disposed to be swept by the gate before the outer posts in the row adjacent the exit are swept by the gate, as clearly illustrated in FIGURE 2, to prevent any of the cows from being trapped by the sweep gate against the posts 60. Posts 60 also encircle the center post 64 to keep the cows away from the center post 64 for the latter's protection.

The inner end of sweep gate 66 is mounted on the vertical center post 64 for rotation thereabout and its outer end is supported by a roller 68 attached in any suitable manner as by pillow blocks 70 to the sweep gate. Roller 68 rides on the top rail 72 of the fence 52 to suspend and support the outer end of the sweep gate.

The sweep gate 66 is provided with a pair of horizontally disposed converging hollow bars 74 and 76 and a plurality of vertical posts 78 are suspended from the sweep gate and located with respect to the posts 60 so as to permit the sweep gate to sweep therethrough, as mentioned above. The front bar 76 is provided with a plurality of nozzles 80 which direct water in the form of a spray ahead of the sweep gate so as to urge the cows toward the exit 62. Inasmuch as the cattle shy from spray, this spray serves to urge the cows ahead of the gate and lessen the tendency of the sweep gate to touch the cows as they are being urged toward the exit. The spray has the additional advantage in wetting the cows, making them easier to clean when they enter the washing and feeding zone.

Additional vertical posts 82 and 84 are disposed in radius line rows between the center post 64 and fencing 52, said posts 82 and 84 are spaced apart a sufficient distance to permit cows to pass therebetween. Nozzles 86 are mounted on the posts 82 and 84 and fence 52 to direct water in spray form on the cows which pass through the rows for additional wetting of the cows for cleaning purposes. Whether the sprays of one row or both rows are on or off depends upon the weather and the condition of the cows at a particular season.

Figure 6:
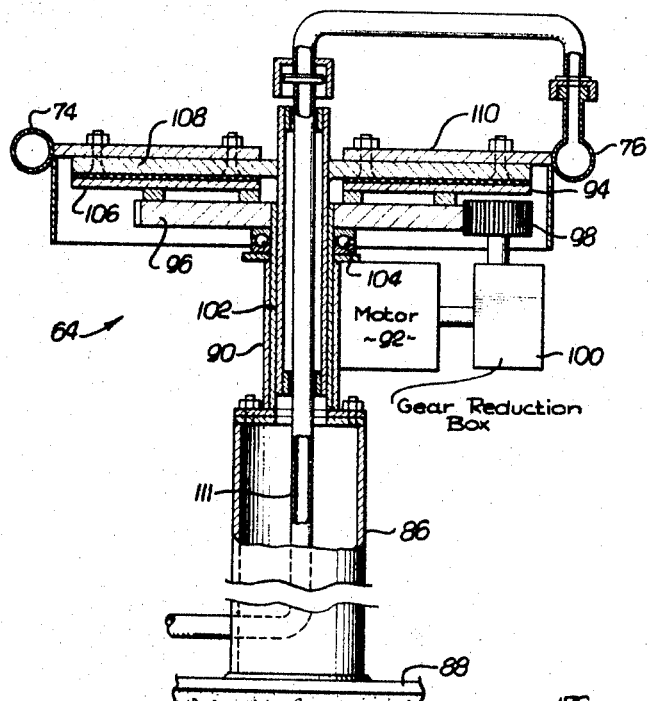
FIGURE 6 is an enlarged elevational view, partially broken away to illustrate the working elements of the center post and drive for the sweep gate taken along line 6—6 of FIGURE 4 and looking in the direction of the arrows.

Turning now particularly to FIGURE 6 which illustrates the vertical center post 64 in more detail, it can be seen that the center post comprises a base 86 mounted directly on a concrete step 88 in the corral area 50, and a vertical extension 90 on which a motor 92 is mounted to drive a horizontal clutch plate 94 through a driving gear 96, pinion 98 and a gear reduction box 100. Driving gear 96 is mounted for rotation on a sleeve 102 coaxially disposed within the extension 90 with suitable bearing means, such as ball bearings 104, located between sleeve 102 and extension 90 being provided for supporting the driving gear. The horizontal clutch plate 94 is provided with facing of clutch material 106 of any suitable type to drive driven clutch plate 108 and plate 110 to which are attached the bars 74 and 76 forming part of the sweep gate, as mentioned above. The clutch formed by plates 94 and 108 serves to prevent damage to the motor 92 if there is an obstruction to the rotation of the sweep gate. The clutch also serves to protect the cattle if for some reason the sweep gate bumps or otherwise touches the cows while in the corral, and also permits the herdsman to move the sweep gate by hand in a forward direction, that is, counterclockwise faster than the motor 92 rotates the sweep gate. Suitable piping 111 extending through the center post 64 connects the bar 76 to a source of water for the spray nozzles 80 mentioned above.

Figure 5:
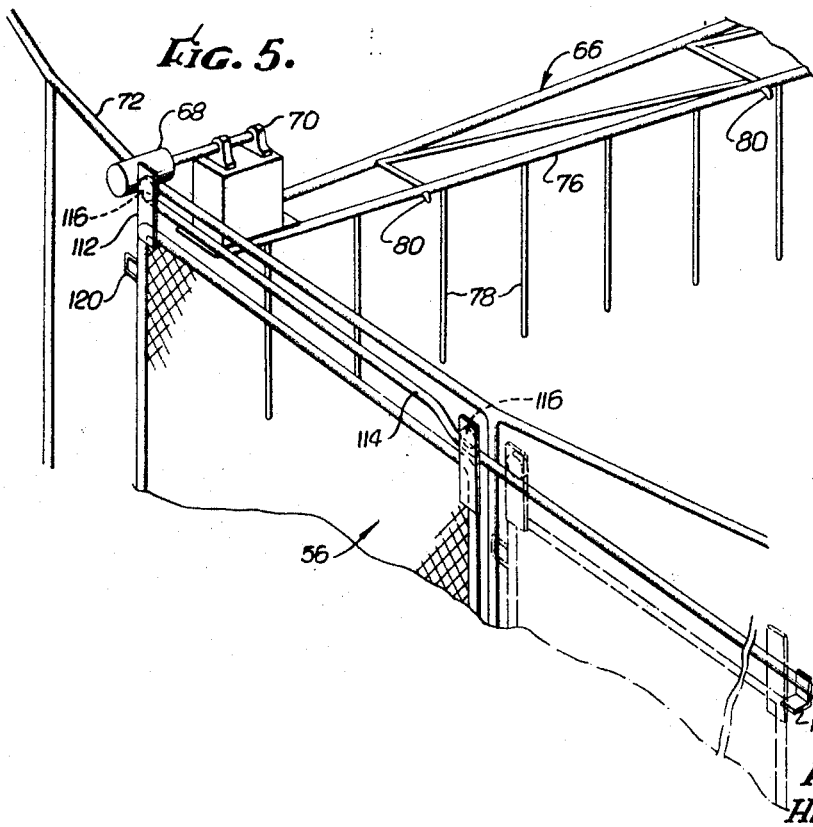
FIGURE 5 is an enlarged perspective view of part of the sweep gate and the fencing for the corral to illustrate to advantage the manner of opening and closing the entrance gate to the corral.

In FIGURE 5, it can be seen that the roller 68 traveling on the top rail 72 of the fence 52 will meet a plate 112 attached to the top of the gate 56 serving to open gate 56 during its course of travel. Gate 56 is mounted on a suspending bar 114 by a plurality of rollers 116 (two shown) which permit the travel of the gate 56 from a closed position as shown in FIGURE 5 to an open position as shown in phantom in FIGURE 5. The travel of the gate to its fully open position is determined by a stop means 118 located on the suspending bar 114. A suitable handle 120 on the gate 56 serves to allow the herdsman to manually close the gate 56 when the herd has been herded into the corral. As can be seen in FIGURES 1 and 5, the top rail 72 of fence 52 is continuous across both the exit 62 and the entrance 54 so that the exit 62 is always open while the entrance 54 is subject to opening and closing by gate 56.

From the above description, it can be seen that the motor 92 rotates the sweep gate 66 counterclockwise sweeping the corral and urging the cows toward the exit 62. The sweep gate rotates at a predetermined rate of speed of about 1 revolution for each five minutes to move a herd toward the exit 62. As the sweep gate 66 sweeps past posts 60, it opens the gate 56 (theretofore closed by the herdsman after the herd has been herded into the corral) and the continued rotation of the sweep gate with the nozzles 80 directing water ahead of the gate urge the cows past the first row of posts 82 and past the second row of posts 84 toward the exit 62.

Figure 9:
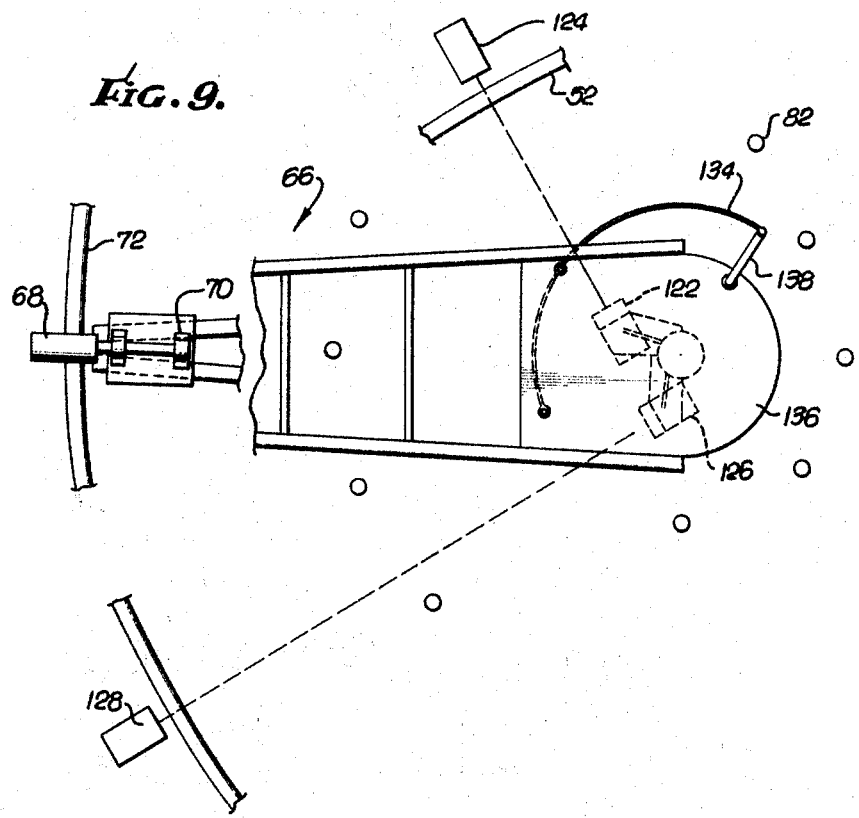
FIGURE 9 is a plan telescoped view of the sweep gate and the detecting means illustrated in FIGURE 7.

It can be appreciated that it is possible for a herd entering the entrance 54 and urged by the sweep gate 66 toward the exit 62 to travel faster than the cows near the exit are able to move out of the exit. It is also possible for cows in the corral to move out the exit 62 faster than the sweep gate travels. Thus, means must be provided in order to detect the presence or absence of cattle ahead of the sweep gate 66. In the present embodiment, as illustrated in FIGURES 7–10, inclusive, it can be seen that the center post 64 is provided with a first detecting means in the form of an electric eye 122 whose light source 124 is located just outside the fencing 52 so as to detect the presence of a cow in the area immediately past the first row of sprays on posts 82, and which directs a beam across a radius of the corral. A second detecting means in the form of an electric eye 126 is also disposed on the center post 64 with its light source 128 also located immediately outside the fencing 52 so as to direct a beam across the area immediately past the second row of sprays on posts 84 to detect the presence of a cow in that vicinity. It is to be noted that the detecting means 122, 124 and 126, 128 operate substantially at right angles to one another in the planar view of the corral, as shown in FIGURE 9, and the electric eyes 122 and 126 are non-rotatably held vertically staggered from one another on supporting shelves 130 and 132. It should also be noted that a light shield 134 is suspended from a top plate 136 by bars 138 on the center post 64 so as to rotate with the sweep gate. This shield is of a vertical width sufficient to block the staggered electric eyes 122 and 126 and is provided with a vertical leading edge 140 and a pair of trailing edges 142 and 144 in staggered relation to one another; the trailing edge 144 being higher than the trailing edge 142. The distance between the leading and trailing edges is determined, of course, by the angle between the two electrics eyes and the distance between the trailing edges themselves is determined by the distance between the electric eyes. The purpose of the shield 134 with its vertical straight leading edge 140 is to cover first the electric eye 122 and then the second electric eye 126 as the sweep gate 66 traverses the corral, but permit the electric eyes 122 and 126 to be opened again to their respective light source simultaneously as the sweep gate sweeps around the corral. The purpose of this latter operation will now be described.

Figure 10:
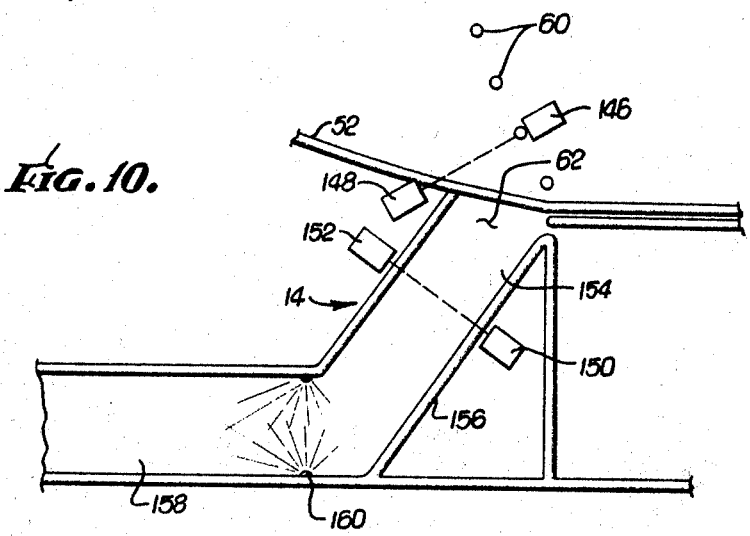
FIGURE 10 is a plan view illustrating the detecting means near the exit of the corral and in the entrance lane to the control area.

Turning first to FIGURE 10, it can be seen that a third detecting means in the form of an electric eye 146 is located in the corral immediately adjacent but prior to the exit 62. The electric eye 146 is located on or near one of the posts 60 and its light source 148 is located outside the fencing 52 so as to detect the presence of a cow immediately prior to the exit 62 by directing a beam of light thereacross. Still another detecting means in the form of an electric eye 150 whose light source 152 directs its beam across a first lane 154 of entrance lane 14 defined by fencing 156 detects the presence of a cow in this lane, which lane is immediately after the exit gate 62 in the path of the travel of a cow in this milking system.

Each of the detecting means, viz, electric eyes 122, 126, 146 and 150 are connected to the motor 92 which drives the sweep gate 66 in such a manner that if any one of the electric eyes is uncovered, the sweep gate will continue to move, urging any cows ahead of it out the exit 62. It can be appreciated that by arranging the electric eyes so that all of them must be blocked, means are provided for detecting spaces ahead of the sweep gate which will be filled by a cow or cows as the sweep gate moves. For example, if any one of the electric eyes is not blocked it means that there is a space provided in the area between the first detecting means and the fourth detecting means so that the sweep gate will continue. Thus, if electric eyes 126, 146 and 150 are blocked, but electric eye 122 is not, the sweep gate will continue until electric eye 122 is blocked by either a cow or the shield 134. Thereafter, the opening or unblocking of any one of the electric eyes 126, 146 and 150 ahead of the electric eye 122 will cause the sweep gate to continue turning until the unblocked electric eye is again blocked.

It can also be appreciated that as the sweep gate rotates to a position beyond the area detected by the second detecting means, electric eye 126, it is desirable that the system detect the presence or absence of cattle in the last two detecting means, electric eyes 146 and 150, and this is accomplished by the light shield 134. This means the light shield 134 in blocking the electric eyes 122 and 126 renders the electric eyes 146 and 150 sensitive to the presence or absence of cattle near the exit gate 62. Were it not for this shield 134, the sweep gate 66 would not be sensitive to this area inasmuch as one of the electric eyes 122 or 126 could be blocked accidentally by cattle behind the sweep gate which would, of course, stop the sweep gate. Eyes 122 and 126 will remain blocked by the shield 134 until the sweep gate passes the exit 62 insuring that there are no cattle ahead of the sweep gate, at which time trailing edges 142 and 144 of the light shield simultaneously permit the light source to direct its beam toward their respective electric eyes, and the cycle of this sweep gate will again start.

It is to be noted that the rotation of the sweep gate 66 in the corral may thus be independent of any timing of the movement of the cages 30 and the milking operation in the control area 16; the timing connection between the sweep gate 66 and the remainder of the system being solely by the detecting of the presence of cattle in the corral and lane 14 so as to stop the rotation of the sweep gate in the event that the sweep gate is travelling faster than cattle can leave the exit 62.

It should also be noted in connection with the four detecting means in the corral and entrance lane, that the light sources and electric eyes could be reversed in direction, for example the light sources 124 and 128 could be mounted on outer post 66 and the electric eyes 122 and 126 located outside the fence or the light sources 124 and 128 could be simply reflectors with the light source and electric eye in the housings of the eyes 122 and 126 in the position shown.

Turning now to FIGURES 1, 2 and 10, it can be seen that the first lane 154, connected to the corral exit 62, serves to direct cattle toward a first stall 158. Entrance to the first entrance stall 158 which also forms part of the entrance lane 14 is defined by a plurality of sprays 160 located on each fence 156 to form a first barrier, directing a spray of water not only toward each other transverse the lane, but also forward and toward the center of the stall to urge the cow therein forward and out of stall 158 at the proper time.

Figure 11:
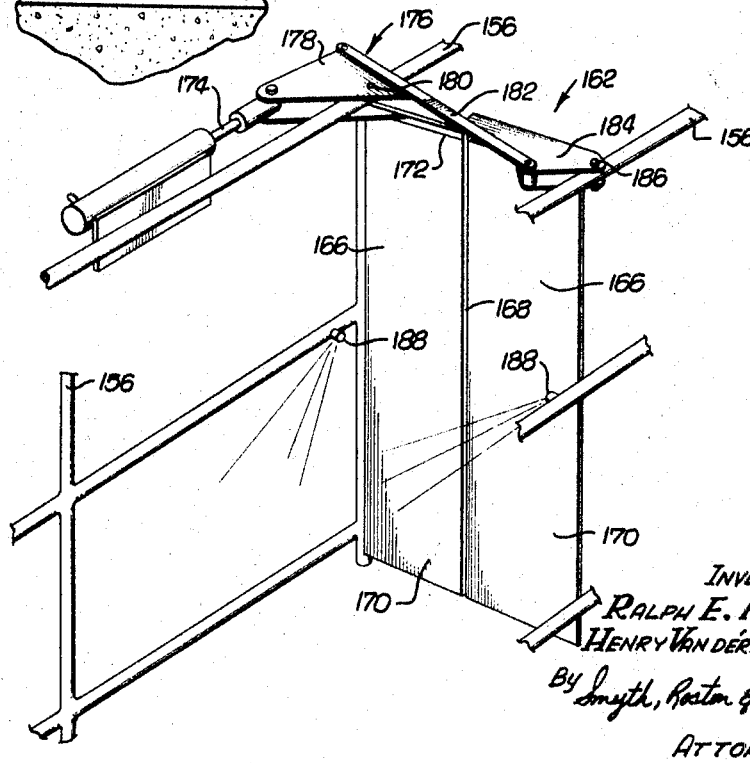
FIGURE 11 is a perspective view of the second barrier or gate to the second entrance stall and illustrating to advantage the sprays for urging the cows forward.
Figure 7:
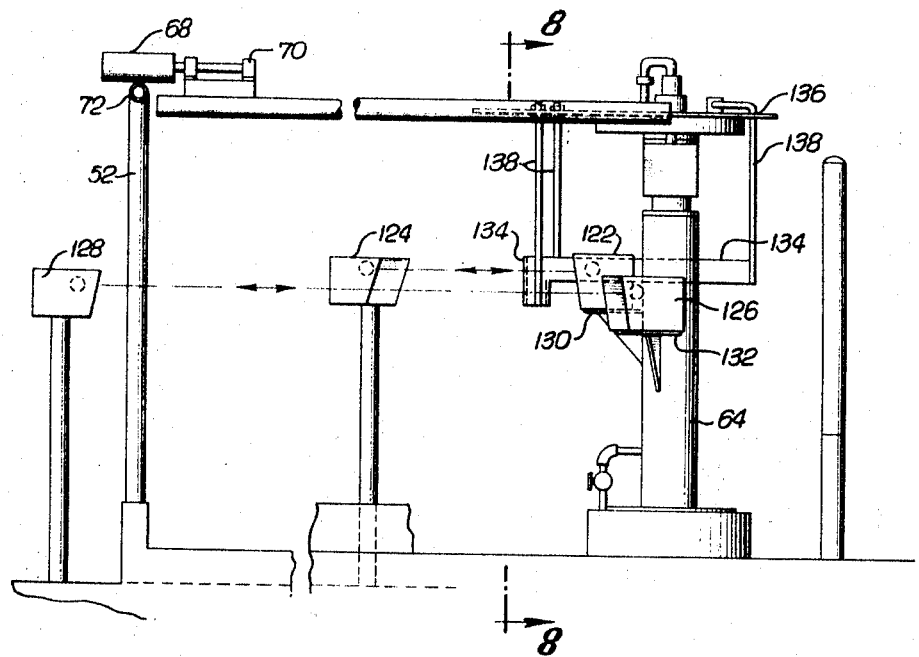
FIGURE 7 is an elevational, semi-schematic telescoped view of the corral and center post with some of the parts removed to illustrate the detecting means for controlling the movement of the sweep gate.
Figure 8:
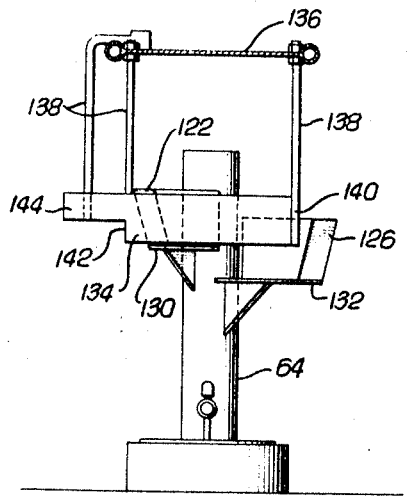
FIGURE 8 is an elevational view of the center post with parts removed to illustrate the shield for the detecting means for controlling the movement of the sweep gate and taken along line 8—8 of FIGURE 7.

A second barrier in the form of a gate, indicated in its entirety as 162, comprises the exit to the stall 158 and the entrance to a second stall 164, also located in entrance lane 14. Gate 162, as more clearly shown in FIGURE 11, comprises a pair of swinging doors 166, suitably mounted on the fencing 156 so as to open at the center 168 toward the second stall 164. Doors 166 comprising strappings 170 of rubber or the like, suspended vertically from bars 172, are actuated by an air powered piston 174 shown attached to fencing 156 and connected to each of the doors by a suitable actuating arm arrangement indicated in its entirety as 176. Movement of piston 174 moves triangular bracket 178 about pivot pin 180 which moves arm 182 to move triangular bracket 184 about pivot pin 186 to open and close the swinging doors. Immediately adjacent the gate 162 and in stall 164, there are a plurality of sprays 188 mounted on the fencing 156 which serve to direct water transverse of the stall and form with the gate 162 part of the barrier means for the exit from the first stall 158 and the entrance to the stall 164. These sprays at the same time direct water toward the exit of the stall 162 at the proper time.

The exit of stall 164 which marks the end of entrance lane 14 is the aforementioned sliding gate 22 (see FIGURE 2). Sliding gate 22, as aforementioned, marks the beginning of the control area 16 which includes the aforementioned feeding and washing zone 18 and the milking zone 20. Means, later to be described, control the timing of the opening and closing of the barriers and sprays.

Control area

Gate 22 disposed transverse to the fencing 156 is actuated by an air powered piston illustrated schematically at 190 in FIGURE 2. Gate 22, by opening and closing, allows a cow to enter the first control stall 26 which also marks the beginning of the washing and feeding zone.

Control stall 26 is provided with an exit barrier in the form of a sliding gate 192 actuated by an air powered piston illustrated schematically at 194 in FIGURE 2. Gate 192 also forms the entrance to the second control stall 28 so that opening of the gate 192 will allow a cow to enter the second control stall 28.

Turning now particularly to FIGURES 12 and 13, where the control stalls 26 and 28 are shown in elevational view, it can be seen that the cow is about to enter one of the aforesaid cages 30. For more control of the cow about to enter one of the cages 30, as illustrated in FIGURE 13, still another barrier means in the form of a swinging arm 196 defines an exit for stall 28. Swinging arm 196 mounted on fencing 156 is actuated by an air actuated piston 198 mounted on the fencing 156 so as to swing arm 196 toward the center of the stall 28 in timing sequence with the opening and closing of the gate 192 from the stall 26, as will be more fully explained.

To motivate the cow toward the cage 30, a moving barrier in the form of bar 200 is disposed transverse to the stalls 26 and 28 (see FIGURE 13) with its ends mounted on a pair of continuous chains 202. Chains 202 are each mounted on a plurality of pulleys, two pair 204, 206 located on the top rail 208 of the fencing 156, and two pair 210, 212 located on the bottom rail 216 so as to form a continuous path for the bar 200 from a position just past the entrance barrier or gate 22 to a position adjacent the barrier or swinging bar gate 196. The upper pair of pulleys 206 are driven by a motor, illustrated schematically at 218, and the path of travel of the bar begins at a position illustrated at X in FIGURES 12 and 13 which is above the cow and within the stall 26 over pulleys 206 down parallel to the gate 22 past pulleys 212 which are located midway the height of a cow and horizontally forward to a position marked Z where it reverses direction around the pulleys 210 and returns at an oblique angle upwardly and around pulleys 204 to its original position X. As will be clear from a more detailed description hereinafter, the bar 200 moves from the position X to the position Z when the gates 192 and 196 are open to move the cow toward the cage 30, and the motor 218 is synchronized with the movement of the cages, or, alternatively the pulleys 206 could be driven by the same motor that drives the cages with a clutch mechanism connecting the pulley 206 with the latter motor. At this time, the gate 22 is closed and a cow is in stall 164. Means, later to be described, are provided for preventing operation of bar 200 in the event the gate 22 is open or in the event no cow is in the control stall 26.

It is to be noted that from the description thus far, a cow entering the control area is completely confined within the stalls and moved while confined toward awaiting cages 30. Cages 30 are each individually suspended on the aforesaid overhead conveyor 32 suspended by suitable rods 219 from suitable I-beams (not shown). Conveyor 32 is a continuous track formed of I-beams which is elevated at one end on curved portion 220, as shown in FIGURE 1, and in the area approximately the entrance to stall 164, and slopes gradually downwardly beginning approximately overhead the sliding gate 192 of the first control stall 26 to a distance sufficiently beyond the second stall 28. The slope to the conveyor track is such that the travel of the cages 30 over the stall 28 positions the rear end 222 of each of the cages to permit the cow to move forward toward the front 224 of the cage as the animal is free to do so when the gate 196 is open and it is urged into the cage by moving bar 200 sweeping the two stalls 26 and 28, as hereinabove explained.

Each cage 30 is provided with a suitable number of rollers 226 to travel on the conveyor 32 and each of the cages is connected to one another through the rollers in any conventional manner as by driving chain 228. Chain 228, in turn, is driven by a suitable motor, illustrated schematically in FIGURE 2, at 230 so that the cages will travel on the continuous conveyor in the washing and feeding zone and the milking zone and will return to a position such as shown in FIGURE 12.

Attention is directed now to FIGURE 14 where one of the cages 30 is illustrated in more detail, except that the rollers 226 are omitted to more clearly illustrate the details of the cage. It can be seen that the rear end 222 comprises a plurality of bars 232 formed to define end side walls 234 and 236. An end bar 238 is pivotally attached to each side wall 234 and 236 to restrain the cow in the cage and urge it along therewith. Bar 238 is movable upwardly and downwardly, as clearly shown in FIGURE 12, to permit the cages 30 to accommodate each other as they move upwardly and downwardly to and from their elevated position inasmuch as the curvature of the conveyor 32 would otherwise cause the cages to interfere with one another by shortening the distance between them, see 240 in FIGURE 12.

The front end 224 of the cage 30 is also formed with a pair of front side walls 244 and 246 and is also provided with a frontal section 248 including bars 250 and 252, respectively. Frontal section 248 accommodates the head of the cow in the cage as shown in FIGURE 18. A suitable baffle 254 of any suitable opaque material such as sheet metal extends around this frontal section 248 so as to obscure the vision of the cow and at the same time prevent the head of the cow from being sprayed with water while passing through the washing and feeding zone. A feeding trough 256 is located in the frontal extension and connected to a feeding conduit 258 open near the top of the cage so as to fill the trough 256 from the top of the cage as it passes certain points in the washing and feeding zone. To stabilize the movement of the cages as they move on the conveyor 32, a stabilizing bar 260 is provided. Stabilizing bar 260 parallels the movement of the cages along the conveyor 32 through the washing and feeding zone and the milking zone and suitable rollers 262 may be attached to the cages to contact the stabilizing bar in a conventional manner.

At the time the cage 30 is in a position on the lower horizontal portion 264 of the conveyor 32 shown partially at the extreme left in FIGURE 12 and about the time a cow is about to be fully within the cage, feeding conduit 258 is beneath a first feed supply arrangement, indicated in its entirety as 266 (see FIGURE 2). This position, as illustrated in FIGURE 2, is to the left of the last control stall 28 and the feed supply arrangement is illustrated schematically in FIGURE 21.

The first feed supply 266 comprises a bin 268 and a vertical feed spout 270. The feed spout 270 is provided with an upper slide gate 272 and a lower slide gate 274, each of which is operated respectively by air actuated power pistons 276 and 278, respectively. Lower slide gate 274, in its closed position, i.e., transverse the spout 270, prevents the feed from dropping into the cage below, at which the upper feed gate may be opened, i.e., in a position not transverse the spout, to permit a supply of feed to drop onto the lower slide gate 274. The closing of the upper slide gate 272 transverse the spout selectively measures a predetermined amount of feed, i.e., volume filling the space 280 between the two slide gates. When a cage 30 is immediately beneath the feed spout 270, the lower slide gate 274 is opened, i.e., moved to a position not transverse the spout, while the upper slide gate remains closed and the feed in space 280 drops into the feed trough. The lower gate 274 then closes and the slide gates repeat their cycle.

While only two slide gates are shown in the feed supply arrangement 266, any number of upper slide gates may be used to vary the amount of feed available to the cage, the one slide gate 272 being merely illustrative of the means for measuring the supply of feed available. As will be clear from a more detailed description hereinafter, the air powered piston 278 is controlled in such a manner that unless a cow has entered a cage, the lower slide gate 274 will not be opened, thus preventing the dropping of food into the empty cage and wasting the same.

When the feed is dropped into the feed trough, the cow about to enter that particular cage will see this food drop and be encouraged to enter. Meanwhile, the cage continues to slowly move in the washing and feeding zone. As shown in FIGURES 1 and 2, there is provided an elongated shallow channel 282 shown filled with water in FIGURE 2, and in cross-section in FIGURES 15 and 17, which begins within the control stalls 26 and 28 and continues a substantial distance ending in a ramp 284, i.e., at the extreme left end, as shown in FIGURE 2. The depth of the pool of water is determined by the height of a drain 286 located to one side of the path of travel of the cows (see FIGURES 16 and 17). As the cow walks through this pool, prompted by being confined in the cage 30, its hooves are cleaned and the animal is sprayed by a spray rack, indicated in its entirety as 288 and shown in FIGURE 15.

Spray rack 288 comprises a pair of baffle walls 290 disposed on opposite sides of the pool and a plurality of upper spray nozzles 292 and lower spray nozzles 294 located adjacent the walls 290 so as to direct water both horizontally and upwardly to wash the cow's back and underside. It is noted that these sprays direct water toward the opposite wall 290, i.e., transverse the direction of movement of the cows. The spray nozzles 292 and 294 are connected by suitable piping 296 to a source of water supply. Controls, including shutoff valve 298 and volume control valve 300 control the amount of water used and the time the sprays are on, as will be explained. It is to be noted that the baffles 254 on the extensions 248 of the cages 30 prevent the spray from touching the head of a cow so as to not disturb the cow as it walks through the washing and feeding zone.

Any number of spray racks 288 may be utilized and located at selected positions in the washing and feeding zone, but it is preferred that all spray racks (except the last spray rack for warm spraying of the cow) be located near the illustrated wash rack 288, i.e., in a positon where the cow is washed immediately after the cage leaves the position where it is supplied with feed from the first feed supply arrangement 266. The first wash rack 288 also may be located in a position to spray the cows while in the control stalls 26 and 28. Inasmuch as the cows are completely under control in these stalls and are not feeding, they would not be disturbed in these stalls.

With the spray racks so located adjacent these stalls, there is time for the cow to drip-dry before it enters the milking zone. The number and location of such sprays will, of course, depend upon the length of the washing and feeding zone and the time it takes to allow the cow to dry before it reaches the milking zone.

The last spray rack, the position of which is determined by the length of time necessary for the cow to let down her milk and the speed of the cage, will be provided with nozzles, such as nozzles 294, so as to direct heat in the form of warm water only to the udder of the cow which will prepare the cow physiologically for milking. That is to say, a cow, becoming accustomed to this system, will know that the milking units are about to be connected to it. This is important for maximum production inasmuch as the cow will thus be stimulated to let down her milk at a time when the milking operation begins. Otherwise, the cows may not be completely milked at the end of the milking operation with a consequent loss in milk production. The control and timing of the warm spray by valves 298 and other means will be explained in more detail hereinafter.

The last spray could be located near the end of the channel 282, but preferably near the point where the cages enter the milking zone with suitable drainage to the channel 282 or to other drains. Also, while warm sprays are disclosed herein for warming the udders, any suitable heat source such as heat lamps or electric heaters may also be used to direct heat to the udders.

As shown in FIGURE 2, a second feed supply arrangement 302 is provided at some position near the point where the cage ends its turn, as at 304, and enters the milking operation. This second feed supply arrangement may be identical to the first feed supply arrangement 226, as shown in FIGURE 21, and may be controlled manually or automatically to supply the cow in the cage with an additional amount of feed, if desired. In this manner, each cow is individually fed according to its needs and its milk-giving ability under controlled conditions.

As the cage finishes turning the curved portion, it begins to enter the milking zone 20, more clearly illustrated in FIGURES 2 and 18. In this position, the cow is moved by the cage 30 onto the moving floor conveyor 34 from the floor 306. Floor 306 comprises, in the embodiment illustrated, a floor of steel plate whose level is adjustable by any suitable means such as by a plurality of floor jacks 308. Floor conveyor 34 comprises continuous chains 310 of the link type interconnected transversely by transverse metallic slats 312 (illustrated schematically), all of which pass around a pair of sprockets 314 and 316 at opposite ends of the platform and are power driven by any suitable means connected to either sprocket, but preferably by the aforementioned motor 230 which also drives the drive chain 228 of conveyor 32. The transverse slats 312 are connected by link pins 318 extending into the ends of the slats and which also pin the various links of the chains 310 together in the conventional manner. Suitable take-up mechanisms for the link chains as the links wear during use are provided in connection with the sprockets 316, but not shown herein for purposes of simplicity of the disclosure of this invention. The upper run of the moving platform conveyor is co-extensive with the floor 306 so that the cows can move readily onto the moving conveyor 34 as they are urged to do so by the travel of the cages.

One feature of this invention to be noted at this time is that with the cows so confined in the cages as they enter the milking zone, those which have a tendency to kick may be easily restrained by a chain 320 which may be unhooked from the front side wall 244 and placed around the legs of the cow and connected to the end side wall 234 at the time when the operator places the inflations 322 of the milking units 36 on the cow. Chain 320 may also serve its function if simply connected to end side wall 236, extended around the legs of the cow and hooked back on the end side wall 236 forming a loop around the legs.

As shown in FIGURES 22 and 23, the milking units 36 each comprise a dolly 324 having rollers 326 straddling an I-beam track 328 of the aforesaid continuous overhead conveyor 38 to be moved by conveyor chain 330 to which it is connected by a latch mechanism 334 and illustrated in FIGURES 23 and 26. Conveyor chain 330 is driven in timed relationship with the floor conveyor 34 and the cages 30 by the previously mentioned motor 230 which also drives the chain 228 of conveyor 32 and moving platform 34. Motor 230 is connected to the conveyor chain 330 by suitable drive shafts, gearing and sprockets, and are identified by box 334 for purposes of simplifying the description of this system.

Turning now to FIGURE 26, it can be seen that the latch mechanism 334 comprises a latch arm 336 pivotally connected at one end to the milking unit frame 332 at 338. The other end of the latch arm 336 is provided with a coupling plate 340 having serrations or indentations 342 for engagement with the links of the chain 330 to attach the milking unit 34 to the chain pivots. The engagement and disengagement of the latch arm 336 to the chain is accomplished by a ratchet arm 344 which is pivotally connected to the latch arm 336 at 346, and by a spring 348 coupled to the latch arm by rod 350, the rod 350 being also pivotally connected to the latch arm at 352. Spring 348 is compressed when the latching arm is disengaged from the chain 330 and normally urges the latching arm into engagement with the chain. Ratcheting member 344 is also provided with a slot 354 for engagement and disengagement with a transverse pin 356 fixed to the frame 332. The end of the ratchet arm 344 opposite the pivotal point 346 is also provided with a transverse handle or rod 358 for manual engagement and disengagement of the slot 354 with the pin 356. Thus, pulling of handle 358 downwardly compresses spring 348 to disengage the milking unit from the chain 330 and a further pulling movement with a slight forward movement will release ratchet arm 348 to allow the spring to urge the latching arm 358 toward the chain 330. Thus, an operator may engage and disengage the attaching plate 340 from the links 330 at any time by simple manipulation of handle 358.

Dolly 324 also supports a pump-motor combination 360 and is provided with a suitable frame 362 formed of rods to support a vacuum tank 364 of glass or other suitable material which serves as a traveling milk receptacle. Vacuum tank 364 is connected to the motor-pump combination for creating a vacuum in the tank through vacuum hose 366. The vacuum tank 364 is also connected to a cluster 368 by a conventional hose 370 which, in turn, supplies vacuum to the inflations 322 through the cluster and provides a return for the milk to the vacuum tank. Inflations 322, as shown in FIGURE 22, are connected to the cluster 368 by suitable hoses 372 and are illustrated in this figure in an inflation receptacle 374 attached to the frame 362. In the embodiment illustrated in FIGURE 22, the cluster 368 is hung on a hook 376 formed on the frame 362 and hose 370 is hung over a second hook 378 which is connected to an electrical switch 373. In the position illustrated, the pump-motor combination 360 is inoperative by reason of the separation of the contacts of the switch 373 which disconnects the motor from its source of electrical power. On the other hand, when the hose 370 is removed from the hook 378, the motor-pump combination 360 will create the vacuum in the glass vacuum tank 364 at the time the inflations 322 are attached to the cow to be milked, such as when the cow is in the position shown in the left-hand side of FIGURE 18.

As shown in FIGURES 2 and 24, the overhead conveyor 38 has a first portion 380 paralleling the platform conveyor 34 and the overhead conveyor 32, a return portion 382 to return the milking units to the beginning of the milking zone, and, in addition, two curved end portions 384 and 386 which interconnect the two portions 380 and 382. The milking units 36 are driven along the first portion 382 of the overhead conveyor by the aforementioned conveyor chain 330 powered by the motor 230, as aforesaid. The overhead conveyor also includes a second or inner hollow and electrically conductive track 388 which substantially parallels the conveyor 38 and provides electric power to drive the motor-pump combination 360. As shown particularly in FIGURE 23, a small electrical trolley 390 with suitable contact points 392 make electrical contact with the conveyor 388 to drive the motor-pump combination 360 when the power is not disconnected by the switch 380. This latter occurs at or near the end of the milking zone which is near the end of the parallel portion 380 of the conveyor 38, when the inflations 322 are removed from the cow, inserted in the inflation receptacle 374 and simultaneously the vacuum hose 370 is hung on the hook 378.

Also, at the end of the milking zone, the inflations 322 are removed by the operator while the cow is still on the moving platform, as illustrated in FIGURE 18, and if the chain 320 was used, it is also removed. At this position, the overhead conveyor 32 begins its slope upwardly as illustrated at 394 to raise the cage 30 to allow the cow to be free of its confinement. In order to prevent an overanxious cow from moving out of the cage before it is high enough, a barrier means in the form of the swinging gate 24 is provided. This swinging gate 24, as heretofore mentioned, ends the control area and is mounted on the fencing 156 which forms a part of the return lane 40 and is operated by a suitable air piston 396 mounted on fencing 156 to swing outwardly away from the movement of the cages such as illustrated in FIGURE 2 to permit the cow to walk onto the concrete ramp 397 forming part of the return lane 40.

The return lane 40 has a branch 44 normally closed by a barrier means in the form of gate 42 which swings by action of air operated piston 398, also mounted on fencing 156 to close the lane 40 and open the branch lane 44 to direct the cow to the hospital area (not shown) in the event medical attention is determined by the operator of the system to be needed for the cow leaving the cage at that time. As hereinabove mentioned, the final barrier means comprising swinging gate 24 is the end of the control area and the cow leaving this area is free to return to its home corral or may be directed to the hospital area, as the case may be.

In the meantime, each of the milking units 36, when arriving at the end of the milking zone, that is, in a position near the point when the conveyor 32 begins to slope upwardly in FIGURE 18, are positioned above the receiver tank 46 previously mentioned, which has a means to automatically discharge the milk from the vacuum tank 364 into the tank 46. FIGURES 24 and 25 show one of the milking units immediately above the receiver tank 46 from which the milk is conveyed by a piping 399 to a collecting station (not shown) and one of the milking units at the washing station 48 where the inflations and part of the vacuum tank 364 are being washed and sanitized. The means to automatically discharge the milk from the tank 364 into the receiver tank 46 is shown in FIGURES 25–31, inclusive, and will now be described in detail.

Turning first to FIGURES 27–30, inclusive, the neck 400 of the vacuum tank 364 is closed by a conventional sphere 402. The sphere 402 is mounted on a bracket, indicated in its entirety as 404 which, in turn, is attached to horizontal members 406 of the frame 362 of the milking unit. Bracket 404 comprises a pair of parallel, horizontal arms 408 attached to the frame 362 by any suitable means such as by welding, and a horizontal pivot pin 410 for pivotal movement of a pair of vertical arms 412 and 414 which, in turn, are connected to each other by a cross arm 416. Arm 412 has a roller 418 at its lower extremity arranged to engage a cam 420 on the top surface of the receiver tank 46. Arm 414, at its lower extremity, has a horizontally disposed U-shaped fork 422 to which the sphere 402 is rotatably attached by an axle rod 424. Suitable slots 426 are provided in the fork to permit limited movement of the sphere to sealably engage the throat 428 of the vacuum tank. Engagement of the cam 420 causes the fork 422 and sphere 402 to be removed from the neck 400 whereupon milk will flow into the receiver tank 46. It should also be noted that this function of the system is at a time when the inflations 322 have been removed and the motor-pump combination is stopped.

Turning now particularly to FIGURES 30, 31, and 32, it can be seen that the neck 400 engages a pair of covers 430 pivotally attached but closing the neck 432 of the receiver tank 46. Covers 430 are pivotally attached to the neck 432 by pairs of half rings 434 which loosely receive a pair of tongues 436 formed on the covers to allow pivotal movement. Covers 430 diverge as at 438 to provide an entrance 440 for the neck 400 which cams or moves the covers 430 to open position such as illustrated in FIGURE 30. The covers 430 are arranged to be closed automatically by gravity after the neck 400 passes beyond the end 442 of the covers 430. Thus, as the milking unit 36 approaches the receiver tank 46, the sphere 402 is in closed position, as illustrated in FIGURE 32. Shortly thereafter, the covers are opened and the roller 402 engages the cam 420 to open the vacuum tank whereupon the milk pours into the receiver tank 46. After emptying the milk after the neck 400 leaves the covers 430, the covers again close for the next or succeeding milking unit to enter the entrance 440 to repeat the above operation. The automatic opening and closing of covers 430 eliminates the possibility of contamination of the milk in the tank, and at the same time, the succeeding milking unit provides a cover for the neck so that the milk is not exposed as it leaves the vacuum tank and enters the receiver tank 46.

Figure 33:
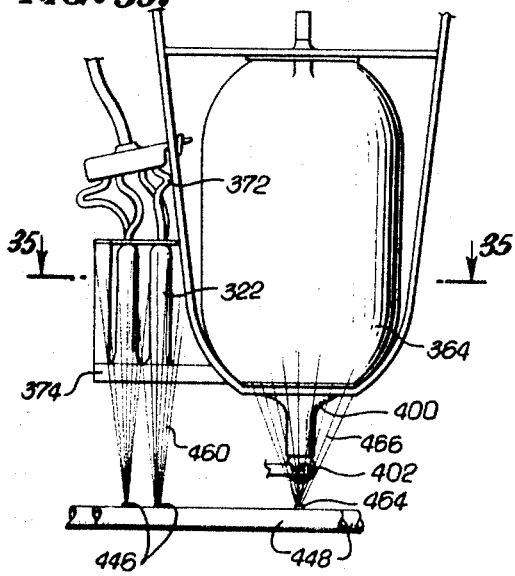
FIGURE 33 is an elevational view, semi-schematic, to illustrate the manner of washing the inflations and the lower portion of the vacuum tank by sprays.
Figure 34:
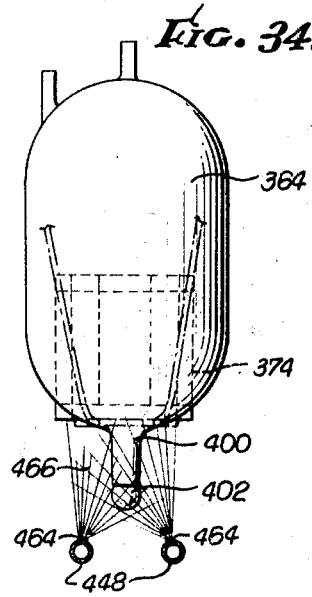
FIGURE 34 is an end elevational view of these sprays as they wash the inflations and the lower portion of the vacuum tank such as illustrated in FIGURE 33.
Figure 35:
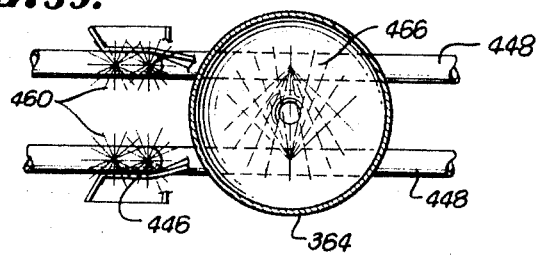
FIGURE 35 is a top plan view showing the direction of the sprays and taken along line 35—35 of FIGURE 33.

Reference is now made again to FIGURES 24 and 25 where one milking unit 34 is positioned over the receiver tank 46 and another over the washing station 48. At the washing station, the inflations 322 and the outside of the vacuum tank 364, and particularly the neck 400 and sphere 402, will be cleaned. As hereinbefore mentioned, this latter washing operation is an important feature of this invention and it is to be noted that the inflations and the tank are washed after each cow is milked. This prevents the spread of any disease, such as mastitis, from one cow to another, and how the washing operation is accomplished can best be seen in FIGURES 33, 34 and 35 where the washing tank 444 at the washing station 48 has been removed to more clearly show the details of the washing operation. It can be appreciated that the washing tank 444 serves to collect the water or other disinfectant during the washing operation, as will now be explained.

In these figures, it can be seen that the inflations 322 are positioned in pairs in the inflation receptacle 374 having been positioned in the receptacle by the operator after removing the inflations from the cow. These inflations are positioned directly over four nozzles 446, each of which directs water or a disinfecting liquid under pressure from conduits 448 in the form of sprays 460, one spray for each inflation. These sprays are directed upwardly into the inner openings of the inflations, as clearly shown in the side view in FIGURE 33, and in the bottom view in FIGURE 35. The inflations being vertically disposed over the spray while in the receptacle 374 will satisfactorily drip-dry so that water or other disinfectant liquid will return to the tank 444. It is important that the inflations are cleaned throughout their length, and the sprays 460 accomplish this. The method heretofore used as mentioned above by simply dipping the inflations into a tank of liquid has been unsatisfactory because the liquid seldom penetrated the uppermost part of the inflations, that is, the part of the inflations near the hoses 472, since most of the time the inflations acted like empty bottles or cups which, when dipped in liquid, would let the liquid enter only part way because of the entrapped air therein.

At the same time the inflations are being cleaned, the neck 400 and sphere 402 are also located over a pair of nozzles 464 which direct sprays 466 of water or other disinfecting liquid upwardly and toward each other to clean the exposed part of the sphere and the neck 400.

Returning again to FIGURES 24 and 25 where the milking units are positioned over the receiver tank and washing tank, respectively, it can be seen that one milking unit is being emptied while another is being washed. The milking unit that is being emptied is now disengaged from the conveyor chain 330, previously described, so that the milking unit stops over the receiver tank 46 a sufficient time for the vacuum tank to empty into the receiver tank. This disengagement is accomplished by locating the return sprocket 470 of the conveyor at a point immediately above the receiver tank so that latch mechanism 434 becomes automatically disconnected when the chain 330 begins the return cycle. Since one milking unit is stopped, it will be bumped slightly by the next succeeding unit whereupon the unit being emptied at that time will move beyond the end 432 of the receiver tank covers 430, allowing the latter to close. At this point, illustrated at 472 in FIGURE 25 on the conveyor track 38, the track inclines slightly, as illustrated at 474, in the direction of the washing station 48 so that the empty milking unit will travel down the incline toward the washing station, where it will be stopped by a stop mechanism 476 which engages the rollers of the dolly 324 to position the dolly over the aforesaid sprays 446 and 464 for cleaning the inflations 322 and the neck 400 and sphere 402.

Stop mechanism 476 comprises an arm 478 which has one end pivotally mounted as at 480 on the track supporting means which may be the previously mentioned I-beams for supporting all of the rest of the conveyors, and indicated in this figure at 482. The other end of the arm 478 is provided with a dolly engaging extension 484 formed to fit over the foremost pair of rollers 326 on the shafts thereof. As will be clear from the position of the pivot, the stop mechanism 476 is gravitationally positioned so that as the milking unit rolls down the incline 474, it engages the dolly and holds the milking unit in place.

In the meantime, the milking unit that preceded the one now being washed has been moved on and around the curved end portion 384 by a pickup mechanism 486 which engages the dolly and urges the dolly along the conveyor curved portion 384.

Pickup mechanism 486, as illustrated in more detail in FIGURES 36 and 37, is positioned at the center of curvature 488 of the curved end portion 384 such as illustrated in FIGURE 24. Pickup mechanism 486 comprises a double arm 488 driven by an electric motor 490. The double arm 488 is mounted for rotation clockwise on a shaft 492 and comprises a first arm 494 and a second and longer arm 496 pivotally mounted at 498 on the first arm 484 and provided with a slight hook 500 at its outer end for engagment with the dolly 324; a pin 502 being mounted thereon for purposes of engaging the hook 500. The mid-portion of the second arm 496 is connected to the end of the first arm 494, through a shock mechanism 504 which absorbs the shock of engagement of the arm 496 with the pin 502 on the dolly. It can be appreciated that when this pickup arm is in motion and engages the stopped but much heavier milking unit, a shock mechanism should be provided to prevent damage to the remainder of the pickup mechanism. This shock mechanism comprises a bracket 506 which is U-shaped in configuration and pivotally mounted at its open end on the midportion of the arm 496 and by a shaft 508 supports a helical spring 510 which engages the end of the bracket opposite its open end and the first arm 494 in such a manner that separation of the two arms 494 and 496 compresses the spring 510 which separation, as illustrated by the arrow 512 in FIGURE 36, is caused by engagement of the hook 500 with the dolly.

As hereinabove stated, when the pickup mechanism 486 engages the dolly, it rotates the milking unit clockwise around the curved end portion 384 of the track out of the way of the on coming milking unit which has just been emptied and started down the incline toward the washing station. The pickup arm immediately before engagement with the dolly engages a lifting arm 514 permanently attached to the stop mechanism arm 466 in FIGURES 25 and 36 so as to lift the stop mechanism out of its dolly engaging position and permit the pickup arm to move the dolly. As soon as the pickup arm passes beyond the influence of the lifting arm 514, the stop mechanism again falls to engage the next dolly on its way down the incline toward the washing station.

Inasmuch as it is contemplated that the pickup mechanism 486 acts intermittently, a suitable switching circuit to operate the motor 490 may be provided. For example, a switch can be provided at or near point 472 to be operated by the milking unit as it starts down the incline 474 so as to turn the motor 490 on and rotate the pickup mechanism to move the milking unit over the washing station out of the way of the on coming milking unit. A suitable stop switch may be provided so as to stop the pickup mechanism arm in a position such as that shown in FIGURE 24 so as to not interfere with the milking unit moving to the washing station. Since suitable and conventional switches such as micro-switches may be utilized in this switching circuit, no further description is deemed necessary herein.

Figure 38:
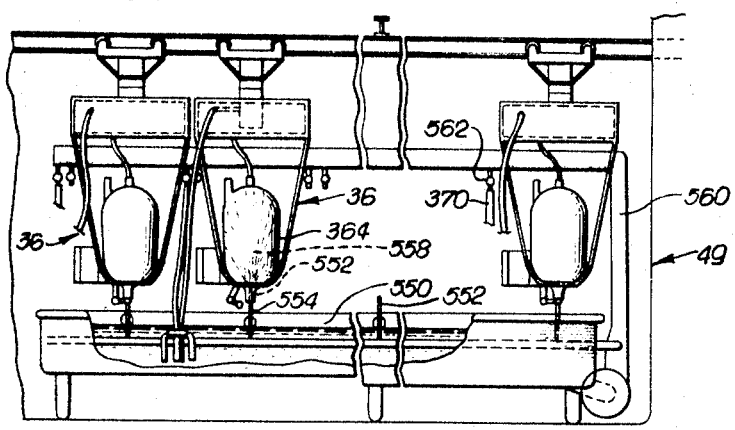
FIGURE 38 is a side elevational view telescoped to show clearly the milking units being cleaned in the washing and repair room.

To explain the movement of the milking units as they leave the washing station, reference is again made to FIGURES 24 and 25 where it can be seen that the curved end portion 384 of the conveyor 38 is provided with a conveyor switch, indicated in its entirety as 516, which will permit the milking unit to continue its course around the curved end portion 384 and to the return portion 382, or direct the milking unit onto a straight portion 518 of the tracks which leads to the wash and repair room indicated in its entirety as 549 shown in plan in FIGURES 2 and 25 and in elevation in FIGURE 38. The conveyor switch 516 comprises a relatively flat carrier 522 which slides transversely of the conveyor track on a pair of transversely disposed tracks 524 in response to pulling of either of the pull chains 526.

Carrier 522, in turn, supports a pair of track segments, one segment 528 being straight so that when in position, joins the curved portion 384 with the straight portion 518, and the other segment 530 curved to form a continuation of the curved end portion 384. Thus, depending upon the position of the carrier 522, the milking units are directed either to the wash and repair room 549 or to the return portion 382 of the conveyor. If in the latter position, the milking units are again moved to the opposite end, that is, toward the curved portion 386 by still another conveyor chain illustrated schematically at 532 in FIGURE 24, driven by a motor illustrated schematically by box 534. Chain 532 is preferably geared to increase the speed of return of the milking units to the beginning of the milking zone.

If the conveyor switch 516 is positioned so that the straight segments 528 connects the curved track to the straight track 518 leading to the wash and repair room, another switch 536 is encountered as the milking unit moves along the track 518.

It should be noted here that at some time, either just prior to the milking unit entering the switch 516 or shortly thereafter, the small electrical trolley 390 for supplying power to the motor-pump combination 360 is disconnected so that the milking unit will be free to move into the wash and repair room 543. Switch mechanism 536, like the switch mechanism 516, is provided with a carrier 538 which slides transversely of the track 518 to connect either a curved track segment 540 or a straight track segment 542 so as to direct the milking units onto curved tracks 546 or 548, both of which curve into the wash and repair room 543. Obviously, the double track 546 and 548 is to double the capacity of the wash and repair room for any selected length of the room.

Turning now to FIGURE 38 where a pair of milking units 36 are shown located over a washing tank 550, it can be seen that when in this position inflations are allowed to soak in a liquid disinfectant in the tank 550 and the entire interior of the vacuum tank 364 is cleaned by a spray 538 from a nozzle 552; such nozzle 552 being located on a flexible hose 554 to allow insertion of the nozzle 552 into the neck of the tank after the sphere 402 has been removed from its seat on the neck of the vacuum tank. At the same time, liquid disinfectant is pumped through piping 560 and into the inflation milk hoses 370 and inflations 322 through spigots 562 to which the inflation milk hoses are connected during the cleaning operation. Thus not only are the vacuum tank and inflations cleaned, but also the milk hoses are cleaned while the milking units are in wash and repair room. This cleaning and repairing operation is, of course, done after the entire milking operation has been completed or can be done on any spare milk units during the time of the milking operation.

Thus, from the above, it can be seen that the milking units are cleaned not only after each milking of each individual cow, but are also completely cleaned at the end of the milking time. After cleaning of the milking units in the washing and repair room, the milking units are simply pushed back through the track switches 536 and 516 back to the washing station 48 where the motor-pump unit is again connected to the electrical dolly to supply power thereto and the carrier 522 of the switch 516 is thrown so that the milking unit can be brought around the curved portion of the track 384 to the return portion 382 and then connected to the return conveyor chain 532 by operation of the latch mechanism 332 previously described in connection with FIGURES 23 and 26. Obviously, instead of first having the milking units returned to the return portion, the milking units could be backed up and located in spaced relationship alongside the cages located over the floor type conveyor where they then can be latched to the conveyor chain 330 and positioned readily for the operation of the milking system. The floor type conveyor and the cages are not then moving.

Operation of system

In order that the complete operation of the above described milking system can be more fully understood, attention is now directed to the schematic drawing, FIGURES 39 and 40, which show the electrical and fluid connections to the various elements in the system for their operation.

In FIGURE 39 there is illustrated a circuit for connecting the motor 92 for driving the sweep gate with the four normally closed electric eyes of the detecting means 122, 126, 146 and 150 arranged to permit power to reach the motor 92 unless all of the electric eyes are blocked. As described in FIGURES 7-10, inclusive, this system permits the sweep gate to continue moving until all electric eyes are blocked which detects the absence of a cow at any one of the strategic points in the corral to prevent crowding thereof by the sweep gate, yet, on the other hand, will stop the sweep gate only if crowding, in fact, exists.

Upon starting the overhead conveyor 32 by supplying power to the motor 230, each cage 30 moves so that its contact (not shown) closes first normally open switch 600 located on or near the conveyor 32. Switch 600 is connected to a detecting means comprising a normally open electric eye 602 located in the first control stall 26 which, in turn, is connected to a first normally open relay 604. If the beam of the electric eye 602 directed across the stall 26 is blocked by a cow in stall 26, the primary circuit to relay 604 is complete and the relay becomes energized. Energization of relay 604 energizes the solenoid 606 of air valve 608 in the secondary circuit of relay 604. Air valve 608 reverses the air in cylinder 610 to move the piston 194 connected to the sliding gate 192 to open the latter. At the same time, air valve 608 reverses the air in cylinder 612 to move piston 198 connected to swinging gate 196 to open the latter. Concurrently therewith, air valve 608 reverses the air in cylinder 614 to close upper sliding gate 272 of the first feed supply 266. When sliding gate 272 closes, sequence valve 616 will open allowing the air flowing to cylinder 618 to actuate piston 278 to open lower sliding gate 274, dropping feed into the cage 30. Sequence valve 616 is the type of valve which is set to open when the pressure in the cylinder reaches a predetermined pressure level which is higher than the pressure needed to close sliding gate 272, yet lower than the maximum pressure directed to cylinder 614; the purpose of the sequence valve is to ensure the closing of gate 272 before opening of gate 274.

It should be noted here, however, that if no cow is in the first control stall 26, as determined by the first detecting means, electric eye 602, the relay 604 will not be energized (closed) and gates 192 and 196 will remain closed and upper sliding feed gate 272 will not close, nor will lower sliding feed gate 274 open to drop feed into the cage 30. It should be noted also that relay 604 is a holding type relay and once closed will remain closed until its primary circuit is broken.

Opening of sliding gate 192 closes the normally open switch 620 located adjacent thereto so as to be actuated thereby. Switch 620 is connected to normally open relay 622 and to normally open switch 624 mounted adjacent gate 22. If the normally open switch 624 is closed by gate 22 in its closed position, then the primary circuit to relay 622 is complete and the closing of relay 622 completes the circuit to motor 218. The normally open switch 624 acts as a safety feature to prevent the moving bar 200 from being driven by motor 218 when gate 22 is open by not allowing relay 622 to be enregized while gate 22 is open.

Motor 218 moves the bar 200 from its position X down the front of the closed gate 22, as explained previously, and toward the position Z where it trips the normally closed switch 626, opening same, said switch being mounted adjacent to the Z position of the bar 200. The tion X, hence it started where it trips the normally open switch 628, closing the latter, and opens switch 629, opening the normally closed switch 629, being connected to the motor 218, breaks the circuit to the motor stopping further travel of the bar 200. Switch 628 will be held closed by bar 200 until the next sequence.

Opening of the normally closed switch 626 by the bar 200 at Z position breaks the secondary circuit in normally open relay 604 to which the switch is connected, de-energizing the solenoid 606 of air valve 608 which permits a spring (not shown) in the valve 608 to move the valve parts so that air in cylinders 610 and 612 is reversed, closing gates 192 and 196 and opening the normally open switch 620 closed theretofore by gate 192 in open position. At the same time, the air in cylinders 614 and 618 is also reversed. When the piston 278 closes gate 274, sequence valve 630 opens, allowing opening of the upper slide gate 272, permitting the food to drop into the feed spout for the next cage 30. Sequence valve 630 is similar in function and operation to sequence valve 616 and serves to insure the closing of gate 274 before the opening of gate 272.

While gates 192 and 196 are still open, however, normally open switch 620 is still closed and normally closed electric eye 631, directing its beam across stall 26, will detect the presence or absence of a cow therein. If there is no cow in stall 26, electric eye 631 will complete one branch of the secondary circuit of relay 634, but if there is a cow in stall 26, this secondary circuit cannot be completed.

In a similar manner, normally open electric eye 632, directing its beam across stall 164, will detect the presence or absence of a cow in stall 164.

If the beam of electric eye 632 is blocked, the primary circuit of normally open relay 634 will be complete and the relay 634 will be energized since the other branch of the circuit was completed by the closing of the normally open switch 628 when the bar 200 returned to its X position. With the closing of the relay 634 and with the normally closed electric eye 631 detecting the absence of a cow in stall 26, the secondary circuit to the solenoid 638 of air valve 640 is complete. Air valve 640 then directs air into cylinder 642 to actuate piston 190 to open gate 22. It should be noted, however, that gate 22 will not open unless normally open electric eye 632 is connected in the primary circuit of the relay 634, nor will gate 22 open unless electric eye 631 indicates the absence of a cow in stall 26 since it is in the circuit connecting relay 634 with solenoid 638. The purpose of having the normally open electric eye 632 ahead of the gate 22 to prevent the opening of gate 22 unless a cow is in stall 164, is to prevent the operation of sprays 166 whose normally closed solenoid valve 646 is connected in the secondary circuit of the relay 634. The energizing of the relay 634 energizes the solenoid of the valve 646, opening the same to turn on the sprays to urge the cows passing the open gate 22 and into control stall 26. However, inasmuch as sprays 166 form a barrier to the entrance of a cow into stall 164, it is desirable that these sprays remain off and the gate 22 remain closed until a cow moves from stall 158 through gate 162 and is in stall 164.

Thus, if the electric eye 632 does not detect the presence of a cow in stall 164, gate 22 will remain closed and sprays 166 will remain off. On the other hand, if an animal is in stall 164 and the electric eye 632 detects same, gate 22 will open and sprays 166 will be turned on to urge the animal into stall 26. When the animal enters stall 26, the animal breaks the beam of a normally closed electric eye 631 directed across stall 26 which breaks the secondary circuit of relay 634 to deenergize the solenoid of valve 646, turning off the sprays 166. The breaking of the secondary circuit to relay 634 also deenergizes the solenoid 638 of air valve 640, allowing the spring therein (not shown) to reverse the air in cylinder 642 to move the piston 190 to close gate 22. Closing of gate 22 closes the normally open switches 624 and 648 mounted adjacent the gate 22 so as to be actuated thereby. The purpose of the now closed, normally open switch 624 as described aforesaid, prevented the motor 218 from moving the bar 200 unless the gate 22 was closed, but now being closed, movement of the bar 200 by motor 218 will open normally open switch 628, breaking the primary circuit of normally open relay 634, deenergizing same. Relay 634 will remain deenergized until switch 628 is again closed and electric eye 632 in stall 164 is again blocked.

The closing of the normally open switch 648 will energize a normally open relay 650, closing the same, provided that a normally open electric eye 652 whose beam is directed across stall 158 detects the presence of a cow in stall 158 and closes to complete the circuit to relay 650. The normally open electric eye 652 and the switch 648 are connected in the primary circuit of the relay 650. If a cow is not in stall 164, as detected by the normally closed electric eye 654 whose beam is directed across stall 164, the secondary circuit of relay 650 will be complete to the solenoid 656 of air valve 658 to energize the solenoid and reverse the air in the cylinder 660 to move the piston 174, opening the doors of gate 162. At the same time, the circuit is complete to the normally closed solenoid of water valve 662, turning on the sprays 160 to urge a cow in stall 158 through the open gate 162 and into stall 164. The purpose of the electric eye 654 in stall 164 for detecting the presence or absence of a cow in stall 164 is to prevent the gate 162 from opening and the sprays 166 from being turned on unless stall 162 is empty.

On the other hand, if a cow is in stall 164, then the purpose of the electric eye 654 is to prevent the gates 162 from opening and to prevent sprays 160 from operating to urge the cow in stall 158 into stall 164. Finally, the purpose of the electric eye 652 for detecting the presence or absence of a cow in stall 158 is to prevent gates 162 from opening and to prevent the sprays 160 from being turned on unless a cow is in stall 158 by preventing energization of the relay 650 which would otherwise happen on the closing of the gate 22. It can be appreciated that a cow will not enter stall 158 because the sprays 160 form a barrier to the entrance of a cow into stall 158.

From the above, it can be seen that the first cow entering the first lane 154 from the corral 12 will approach the first barrier—sprays 160—which will be off due to the detecting means, electric eye 652 in stall 158 and electric eye 654 in stall 164, both of which are coupled to the sprays 158 and gate 162. At the same time, sprays 188 are off because of the detecting means 632 in stall 164 which prevent the completion of the primary circuit to energize relay 634 unless an animal is detected by the electric eye 632 in stall 164. At the same time, gate 22 is closed since the relay 634 is not energized and bar 200 is immobile because the normally open switch 620 is open with gate 192 being closed.

Thus, when the sprays 160 are off and gate 162 closed, as the first cow enters the stall 158, it breaks the beam of the electric eye 652 allowing the relay 650 to be energized (switch 648 also being closed by gate 22), opening gate 162 and simultaneously turning on the sprays 160 to move the cow into stall 164.

With the presence of a cow in stall 164, the beam of electric eye 632 is broken, completing the primary circuit to relay 634 (normally open switch 628 being closed by bar 200) which energizes the solenoid of water valve 634, turning on sprays 166 and simultaneously opening gate 22. The opening of gate 22 breaks the primary circuit to relay 650, deenergizing the latter and deenergizing the solenoid of air valve 658, permitting springs (not shown) in valve 658 to reverse the direction of air in the cylinder 660, closing gate 162. Simultaneously, the deenergization of the relay 650 also deenergizes the solenoid of water valve 662, turning off the sprays 160, permitting the second cow to enter stall 158.

The presence of a cow in stall 164 is also detected by the electric eye 654 in the secondary circuit of relay 650 which prevents the operation of the air valve 658 and water valve 662 until the cow in stall 164 moves into stall 26 past gate 22 and gate 22 closes. The movement of the first cow into stall 26 is detected by the electric eye 631 which breaks the secondary circuit of relay 634, allowing gate 22 to close and turning off sprays 166. The closing of gate 22, of course, closes switch 624 so that as soon as gate 192 is opened by the presence of a cow in stall 26, being detected by electric eye 602, relay 604 is energized. Relay 604 then energizes the solenoid 606 of air valve 608, opening gate 192 which closes switch 620 to energize the relay 622 starting the motor 218 to move the bar 200 from position X to position Y and return. Movement of the bar 200 from position X also deenergizes relay 634, preventing operation of sprays 166 and opening of gate 22. The energization of relay 604 also opens gate 196 and the cow will be urged by the bar 200 into the cage 30 where it will be walked by the cage, as above explained.

In the meantime, other cows following the first cow will enter the stalls 158 and 164 and the gates and the sprays will be operative, depending upon the presence of the cow in either of the stalls or both, as the case may be.

Turning now to FIGURE 41 where the second feed supply 302 is shown schematically, this second feed supply is located in FIGURE 2 at a point where feed will be introduced into the cages either just before the cages enter the milking zone or shortly thereafter. As shown in this figure, the feeding trough 690 is provided with a lower slide gate 692 and a plurality of upper slide gates 694. The lower slide gate is actuated by an air power piston 696 and each of the slide gates 694 are powered by an air power piston 698, and the latter are each provided with manually operable valves 700. The amount of feed to be dropped into the feed trough is selected by opening any one of the manually operated valves 700 which determines which of the upper slide gates will become operative upon the actuation of this circuit.

A normally open switch 702 is located adjacent the conveyor and is tripped by a contact located on the cage 30 as the cage moves on the conveyor. This contact may be the same contact which trips the previously mentioned switch 600 and described in FIGURE 40. Switch 702 is connected to a normally open electric eye 704 which directs a beam transverse the cage 30 to detect the presence or absence of a cow in the cage passing by. If a cow is in the cage, electric eye 704 completes the circuit to the solenoid 706 of the air valve 708. When this occurs, the air in the air line 710 normally directed to the inlet of the cylinder 712 spaced furthest from the spout 690 (during the time when the normally open switch 702 is open) to hold the slide gate 692 closed, then becomes reversed and air under pressure is then directed to line 714 to enter any one of the cylinders selected by the open, manually operated air valves 700. For example, if the uppermost manually operated air valve 700 is open, the air will enter the inlet of top cylinder 716 spaced the greatest distance from the spout 690 and urge the top slide gate 694 closed. When the top slide gate 694 is closed and the pressure behind the piston 698 increases, selector valve 718 will then open because of the increase of pressure in the line 714 and allow air under pressure to enter line 720 to reverse the direction of the air in cylinder 712 to open the slide gate 692 and allow the feed to drop into the cage immediately beneath. When the contact on the cage passes beyond the influence of the normally open switch 702 to again open the same, suitable springs in the air valve 708 reverse, causing a reversal in the pressure in the lines. Thus, air under pressure then enters line 710 so as to move the slide gate 692 closed and, once closed, the increase in pressure causes the sequence valve 722 to open and allow air under pressure to enter line 724 connected to the top cylinder 716 to open the top slide gate 694. This cycle of opening and closing one of the upper slide gates and the lower slide gate occurs every time the switch 702 is activated provided, however, that the electric eye 704 detects the presence of an animal in the cage. The purpose of the sequence valves 718 and 722 is to insure that one of the upper slide gates is closed prior to the time the lower slide gates open and, vice versa, to avoid spilling of the feed from the spout. If at any time it is deemed necessary or desirable to prevent operation of the feeder, the manually operable valve 726 may be closed to prevent the air from reversing in the cylinder 712 so that the lower slide gate will always remain closed.

Turning now to FIGURE 42, it can be seen that a circuit is provided for the warm sprays which physiologically condition the cows to let down their milk at the proper time and which, in the illustrated embodiment of this invention, comprise sprays, such as sprays 294, of one of the spray racks 288. This circuit for these sprays comprises a normally open switch 732 fixedly located on the conveyor for the cages 30 to contact and a contact is provided on the cages, which contact may be the same contact which tripped the switches 600 and 702. The contact closes the normally open switch 732 to complete the circuit to the solenoid of the normally closed water valve 298 to turn on the warm water of sprays 294, but only if the detecting means in the form of electric eye 734 directing its beam across the path of travel of the cages detects the presence of a cow in the cage 30. If no cow is detected, the solenoid of valve 298 remains deenergized and the sprays remain off, but if a cow is in the cage, the circuit is complete and the valve 298 turns on the sprays 294. The length of the arm 736 on switch 732 determines the length of time the switch 732 remains closed which, in turn, determines the length of time that the sprays 294 remain on, providing the electric eye 734 completes the circuit thereto.

It should be borne in mind that as mentioned previously, the main purpose of the warm sprays is to heat the udder of the cow and consequently dry heat from a heating coil or lamp may be used and may be connected in the circuit described and shown in this FIGURE 42 like the valve 298 and operated in the same way.

In connection with the spray rack adjacent the control stalls 26 and 28 to wash the cow while confined therein, the circuit described above in connection with the warm sprays 294 could be used by mounting the switch 732 with its arm 736 so as to be contacted by the moving bar 200 or, if desired, the arm could be actuated by either one of the gates 22 or 192 and the electric eye 734 arranged to operate only if the presence of a cow was detected in the stall 26.

FIGURE 43 illustrates schematically the means for controlling the exit gate 24. Normally open switch 740 is located adjacent the conveyor and contacts on each of the cages 30 close the switches as they contact switch 740. The contact for closing switch 740 may be the same contact which operates switches 600, 702 and 732. The closing of the switch 740 completes the circuit to the normally open holding relay 742 energizing the same to energize the solenoid 744 of the air valve 746 directing air into the air cylinder 748 to move the air power piston 396 to open gate 24. Relay 742 will keep the solenoid 744 energized until the normally closed switch 750 is opened by the contact on the cage 30 which heretofore closed switch 740, deenergizing the same and at the same time deenergizing the solenoid 744 permitting a spring (not shown) in air valve 746 to move the parts of the valve to reverse the air in the cylinder 748 to reverse movement of the piston 396 and close gate 24.

As hereinabove explained, the hospital gate 42 for diverting a cow needing medical attention to the hospital lane 44 is actuated by power piston 398. As seen in FIGURE 43, power piston 398 is controlled by air cylinder 752 having connected thereto a manually operated air valve 754 located any place in the system where convenient so as to control the direction of the presence of the air in the cylinder 752 to open and close the gate 42.

Finally, turning again to FIGURES 1 and 2, it can be seen that the system above described may be partly enclosed in a suitable building and parts of the system, while shown on one level, may be located on different levels to fit the contour of the land or buildings where the system is incorporated and suitable ventilation for the milking zone may be provided by breezeways and the like where necessary or desirable.

While only a single embodiment of the present invention is disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. In a system for milking cows, the combination of:
    means supporting a plurality of bottomless cages to receive individual cows therein,
    a first zone having means for washing and feeding the cows while in said cages, said cages being movable for causing said cows to walk through said first zone, and
    a second zone having a moving conveyor floor and having means for milking the cows while the cows are on the movable floor, said cages being moved by said support means synchronously with said conveyor floor to confine the cows thereon.

2. The system claimed in claim 1, wherein each cage has a feed trough for permitting the cow to feed while walking therein, and
    means for filling said feed trough located near the beginning of said first zone to allow the cow to feed while moving through said first zone.

3. The system claimed in claim 2, wherein a second means for filling said feed trough is located adjacent the end of said first zone for additional feed to those individual cows determined to need such additional feed.

4. In a system for milking cows, the combination of an entrance area and a control area, said entrance area comprising:
    means defining a corral for receiving a herd of cows to be milked,
    an entrance lane connected to said corral to direct cows in succession to said control area,
    said entrance lane having a first stall to segregate an individual cow therein from the rest of the herd and defined by first barrier means and second barrier means, said entrance lane having a second stall defined by said second barrier means and third barrier means, the latter openable into said control area, said control area connected to said entrance area and comprising, a plurality of bottomless cages to receive individual cows therein in succession from said entrance area, means to move said cages to force the cows to walk through a first zone and into a second zone in succession, means in said first zone for washing and feeding the cows while the cows are walking in said cages, a conveyor floor to carry the cows through the second zone while the cows are in the cages, and means in said second zone for milking the cows while the cows are in the cages.

5. A system as set forth in claim 4 in which said first barrier comprises a first spray means, in which said spray means is operable on opening of said second barrier to urge a cow therein into said second stall, and in which said second stall has means therein operable on opening of said third barrier means to urge a cow therein into said control area.

6. The system claimed in claim 4, wherein said first barrier means comprises a first spray means.

7. The system claimed in claim 6, wherein said first spray means is operable on opening of said second barrier means to urge said cow therein into said second stall.

8. The system set forth in claim 7 wherein said second stall has means therein operable on opening of said third barrier means to urge a cow therein into said control area, said second stall also having means for controlling the operation of said urging means in the second stall to urge a cow into said control area so that the latter means will be inoperative unless the cow is in said second stall.

9. The system claimed in claim 8, wherein said means in said second stall to urge a cow therein into said control area comprises second spray means.

10. The system claimed in claim 9, comprising means for controlling said first spray means and said second barrier means so that said first spray means will be inoperative until said second barrier means is open and said second barrier means will not open unless said second stall is empty.

11. The system claimed in claim 10, wherein said control area further comprises a control stall defined by said third barrier means and fourth barrier means.

12. The system claimed in claim 11, further including means for controlling said second spray means so that said second spray means will be inoperative until said third barrier means is open.

13. The system claimed in claim 12, further including a second control stall in said control area defined by said fourth barrier means and fifth barrier means.

14. The system claimed in claim 13, further including means for urging a cow from said first control stall into said second control stall.

15. The system claimed in claim 14, wherein said means for urging a cow from said first control stall into said second control stall comprises bar means movable transversely through said first control stall and through said second control stall.

16. The system claimed in claim 15, comprising means for controlling the means for urging a cow from said first control stall into said second control stall so that said means will be inoperative until said fourth barrier means is open.

17. The system claimed in claim 16, further including means for controlling said fourth barrier means so that said fourth barrier means will not open until the cage is in position to receive a cow from said second control stall.

18. The system claimed in claim 17, further including means for controlling said fourth barrier means so that said fourth barrier means will not open unless a cow is in said first control stall.

19. The system claimed in claim 18, further including feeding means for conveying feed successively to each successive cage as it begins to move through said first zone and means for preventing the operation of said feeding means if a cow has not entered the cage when in position to receive a cow from said second control stall.

20. The system claimed in claim 2, further including means for detecting the presence of a cow in each cage and means responsive to said detecting means to stop the operation of said filling means so that the feed trough in any empty cage will not be filled.

21. In a system for milking cows, the combination of:

an entrance area having means defining a corral for receiving a herd of cows, said corral having an entrance and an exit, means for traversing the entire corral for directing cows entering the entrance towards said exit, spray means carried by said traversing means for urging the cows towards the exit ahead of the traversing means, a control area connected to the exit of said corral, a plurality of bottomless cages to receive individual cows therein, means to move said cages through said control area to force the cows to walk through at least an initial portion of the control area, said initial portion comprising a first zone with means for washing and feeding the cows while the cows are walking in said cages, and a second zone in the control with means for milking the cows while the cows are in said cages.

22. In a system for milking cows, the combination of:

a series of bottomless cages, conveyor means to move said cages along a closed path through a first zone and a second zone and back to the beginning of the first zone, a conveyor floor extending along said path through said second zone for movement through the second zone in synchronism with the cages, an entrance lane in the beginning of the first zone to permit successive cows to enter the successive cages to be urged by the successive cages to walk through the first zone and onto the conveyor floor to be carried by the conveyor floor through the second zone while confined by the cages, an exit lane at the end of the second zone to receive the successive cows from the successive cages, means in the first zone to prepare the cows for milking as they walk through the first zone, and means in the second zone to milk the cows while they stand on the conveyor floor.

23. A combination as set forth in claim 22 which includes a pool of cleaning liquid through which the cows walk in the first zone.

24. A combination as set forth in claim 22 which includes spray means to wash the cows as they walk through the first zone inside the cages.

25. A combination as set forth in claim 24 which includes means to prevent the head of a cow from being washed as the cow walks through said first zone.

26. A combination as set forth in claim 22 in which said conveyor means lowers the successive cages to confine the entering cows at the beginning of the first zone and elevates the successive cages to release cows therefrom at the end of the second zone.

27. A combination as set forth in claim 26 which includes barrier means operable in timed sequence with the movement of the cages to allow a cow to enter a cage only when the cage is in position to receive the cow.

28. A combination as set forth in claim 26 which includes a control stall at the entrance lane and means to traverse the control stall forwardly against the rear ends of the successive cows to urge the cows into the beginning of the first zone in timed relation to the lowering of the successive cages.

29. A combination as set forth in claim 28 which includes a second control stall in the entrance lane leading to the first mentioned control stall, and
includes means to urge cows from the second control stall into the first control stall in timed relation to the movement of said urging means.

References Cited

UNITED STATES PATENTS

| | | | |
|---|---|---|---|
| 1,968,564 | 7/1934 | Luks | 119—14.04 |
| 2,092,440 | 9/1937 | Cain | 119—14.04 |
| 2,305,259 | 12/1942 | Jeffers | 119—14.04 |
| 3,095,854 | 7/1963 | Bott et al. | 119—14.04 |
| 3,116,713 | 1/1964 | Darling | 119—14.04 |
| 3,223,070 | 12/1965 | Grebble et al. | 119—14.03 X |
| 3,246,631 | 4/1966 | Holm | 119—14.03 |
| 3,282,250 | 11/1966 | Cain | 119—14.04 |

HUGH R. CHAMBLEE, Primary Examiner

U.S. Cl. X.R.

119—14